(12) United States Patent
Maltsev et al.

(10) Patent No.: US 10,014,697 B2
(45) Date of Patent: Jul. 3, 2018

(54) CONTROL METHOD FOR DISCONNECTING SWITCHES INTEGRATED IN SERIES-CONNECTED BATTERIES

(71) Applicants: Yevgeny Maltsev, Hudson, MA (US); Oleg Kerbel, Needham, MA (US); C. Michael Hoff, Boxborough, MA (US); Greg Tremelling, Berlin, MA (US)

(72) Inventors: Yevgeny Maltsev, Hudson, MA (US); Oleg Kerbel, Needham, MA (US); C. Michael Hoff, Boxborough, MA (US); Greg Tremelling, Berlin, MA (US)

(73) Assignee: NEC Energy Solutions, Inc., Westborough, MA (US)

(*) Notice: Subject to any disclaimer, the term of this patent is extended or adjusted under 35 U.S.C. 154(b) by 527 days.

(21) Appl. No.: 14/482,156

(22) Filed: Sep. 10, 2014

(65) Prior Publication Data

US 2016/0072315 A1 Mar. 10, 2016

(51) Int. Cl.
*H02J 7/00* (2006.01)
(52) U.S. Cl.
CPC .......... *H02J 7/0016* (2013.01); *H02J 7/0014* (2013.01)
(58) Field of Classification Search
CPC .............................. H02J 7/0014; H02J 7/0016
USPC ....................................................... 320/118
See application file for complete search history.

(56) References Cited

U.S. PATENT DOCUMENTS

| | | | |
|---|---|---|---|
| 6,211,650 B1 * | 4/2001 | Mumaw | H02J 7/0016 320/120 |
| 8,829,716 B2 * | 9/2014 | Tinglow | H02J 7/0016 307/65 |
| 2008/0012531 A1 * | 1/2008 | Chang | H01M 10/4207 320/134 |
| 2008/0116850 A1 * | 5/2008 | Konishi | H02J 7/0016 320/118 |
| 2009/0066291 A1 * | 3/2009 | Tien | H02J 7/0016 320/118 |
| 2011/0140665 A1 * | 6/2011 | Tamezane | H02J 7/0016 320/118 |
| 2014/0184161 A1 * | 7/2014 | Deal | H02J 7/0019 320/121 |

FOREIGN PATENT DOCUMENTS

FR 2983364 A1 * 5/2013 ............... H02J 7/00

* cited by examiner

*Primary Examiner* — Richard Isla Rodas
*Assistant Examiner* — Manuel Hernandez
(74) *Attorney, Agent, or Firm* — Chapin IP Law, LLC

(57) ABSTRACT

Systems and methods of providing integrated battery protection for a plurality of series-connected batteries, in which a plurality of controllable switches are used to disconnect or otherwise isolate the respective batteries, substantially simultaneously, from an external circuit in response to certain fault or non-fault battery conditions. When the plurality of controllable switches are synchronously transitioned from a closed or "ON" state to an opened or "OFF" state, the voltages of the respective batteries become distributed among the controllable switches, allowing for the use of switches having a reduced voltage rating as well as a reduced cost. By connecting a balancing resistor across each of a plurality of series-connected battery/switch pairs, a more even distribution of the voltages of the respective batteries among the controllable switches can be achieved, providing the system with more predictable operation.

20 Claims, 11 Drawing Sheets

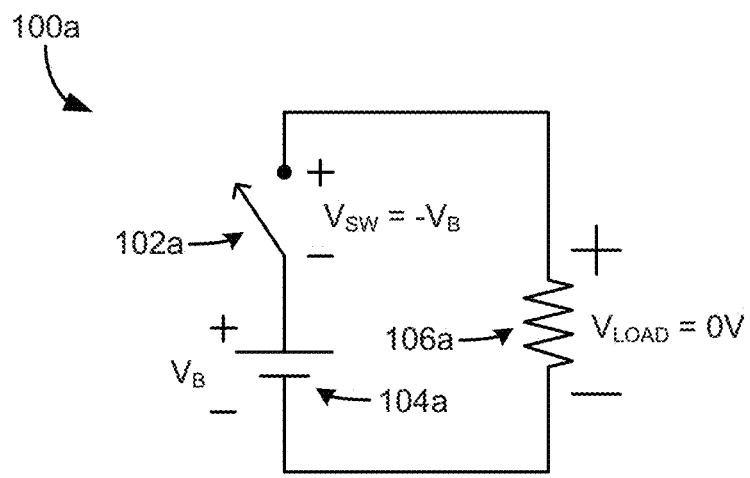
*FIG. 1a – Prior art*
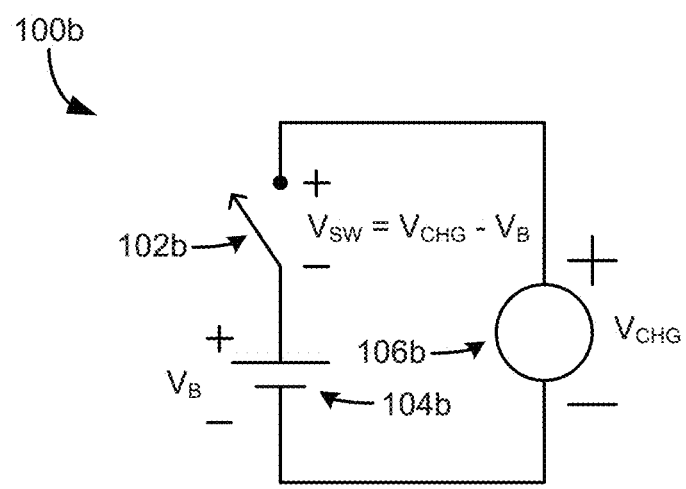
*FIG. 1b – Prior art*

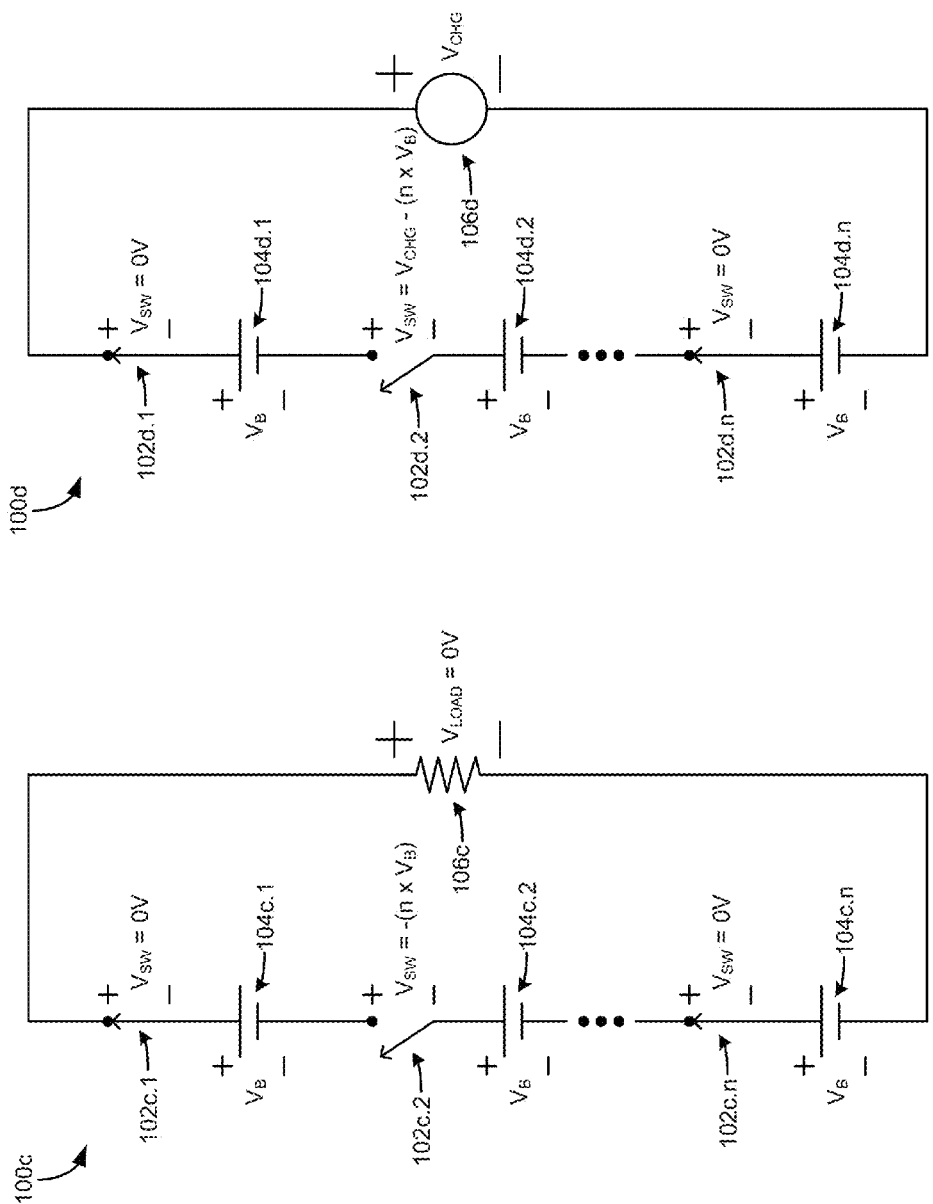

CONTROL METHOD FOR DISCONNECTING SWITCHES INTEGRATED IN SERIES-CONNECTED BATTERIES

TECHNICAL FIELD

The present application relates generally to systems and methods of battery management that provide integrated battery protection, and more specifically to systems and methods of providing integrated battery protection for series-connected batteries that allow for the use of controllable switches having a reduced voltage rating as well as a reduced cost.

BACKGROUND

Battery management systems are known that employ controllable switches for disconnecting or otherwise isolating batteries from external circuits when one or more of the batteries are subject to certain fault or non-fault battery conditions. In a conventional battery management system involving a single battery, such a controllable switch is typically connected in series with the single battery. Further, a discharging circuit or a charging circuit can be formed by connecting a load or a charging voltage source, respectively, across the series-connected battery and controllable switch. In the event of a certain fault or non-fault battery condition, the controllable switch can be transitioned from a closed or "ON" state to an opened or "OFF" state, thereby disconnecting the battery from the discharging circuit or the charging circuit of which the battery was a part. For example, in a discharging circuit, such a battery condition might result from the battery being fully discharged or having its temperature exceed a preset limit. In a charging circuit, such a battery condition might result from the battery being fully charged or experiencing thermal runaway.

In such a conventional system involving a single battery, when the single battery is disconnected from the discharging circuit by the controllable switch, the switch can experience a voltage of up to the maximum voltage of the battery when fully charged. Further, when the single battery is disconnected from the charging circuit by the controllable switch, the switch can experience a voltage of up to the difference between the charging voltage and the battery voltage. To avoid having the switch experience a voltage in excess of its voltage rating (i.e., the maximum voltage that the switch can tolerate while in the opened or OFF state), the switch is typically selected such that its voltage rating can (a) accommodate the maximum battery voltage when it is used to disconnect the battery from the discharging circuit, or (b) accommodate the maximum charging voltage when it is used to disconnect the battery from the charging circuit.

In another conventional battery management system involving multiple batteries, such a controllable switch can be connected in series with each of the respective batteries, and the series-connected batteries and controllable switches can, in turn, be connected in series. Like the conventional system involving a single battery, a discharging circuit or a charging circuit can be formed by connecting a load or a charging voltage source, respectively, across all of the series-connected batteries and controllable switches. In the event of a certain fault or non-fault battery condition, one of the controllable switches connected in series with the respective batteries can be transitioned from the closed or ON state to the opened or OFF state, thereby disconnecting the multiple batteries from the discharging circuit or the charging circuit of which the batteries were a part.

In such a conventional system involving multiple batteries, when the multiple batteries are disconnected from the discharging circuit by one of the controllable switches, the switch can experience a voltage of up to the sum of the voltages of all of the respective batteries. Further, when the multiple batteries are disconnected from the charging circuit by the respective switch, the switch can experience a voltage of up to the difference between the charging voltage and the sum of the voltages of all of the respective batteries. As with the conventional system involving the single battery, to avoid having a switch experience a voltage in excess of its voltage rating, each switch is typically selected such that its voltage rating can (a) accommodate the sum of the maximum voltages of all of the respective batteries when it is used to disconnect the multiple batteries from the discharging circuit, or (b) accommodate the maximum charging voltage when it is used to disconnect the multiple batteries from the charging circuit.

The conventional battery management systems described herein have several drawbacks, however. For example, the cost of the controllable switches employed in such conventional systems generally increases in proportion to the voltage rating of the respective switches, potentially making such switches prohibitively expensive for some battery management applications. Further, such switches that have increased voltage ratings typically exhibit a relatively high internal series resistance, which can result in increased losses and reduced efficiency, as well as the need for costly thermodynamic mitigations in the system design. In addition, in the conventional system that involves multiple batteries, the number of batteries employed in the system can be limited by the voltage rating of the controllable switches selected for use therein, due at least in part to the increased cost of such switches having high voltage ratings.

It would therefore be desirable to have improved systems and methods of providing integrated battery protection for series-connected batteries that avoid at least some of the drawbacks of the conventional battery management systems described herein.

SUMMARY

In accordance with the present application, systems and methods of providing integrated battery protection for a plurality of series-connected batteries are disclosed, in which a plurality of controllable switches are used to disconnect or otherwise isolate the respective batteries, substantially simultaneously, from an external circuit in response to certain fault or non-fault battery conditions. When the plurality of controllable switches are synchronously transitioned from a closed or "ON" state to an opened or "OFF" state, the voltages of the respective batteries become distributed among the controllable switches, allowing for the use of switches having a reduced voltage rating as well as a reduced cost. By connecting a balancing resistor across each of a plurality of series-connected battery/switch pairs, a more even distribution of the voltages of the respective batteries among the controllable switches can be achieved, providing the system with more predictable operation.

In one aspect, a system for providing integrated battery protection for series-connected batteries includes a plurality of batteries, a plurality of controllable switches, and a plurality of controllers. The plurality of batteries are connected in series with the plurality of controllable switches, respectively, to form a plurality of series-connected battery and controllable switch pairs (each such a series-connected battery and controllable switch pair also referred to herein as a "battery/switch pair"), which, in turn, are connected in series. In an exemplary aspect, a load can be connected across the plurality of series-connected battery/switch pairs to form a discharging circuit. In a further exemplary aspect, a charging voltage source can be connected across the plurality of series-connected battery/switch pairs to form a charging circuit. The system further includes a plurality of balancing resistors, in which each balancing resistor is connected across a respective one of the plurality of series-connected battery/switch pairs. Each battery/switch pair having a respective balancing resistor connected thereacross is referred to herein as a "managed battery cell". Each of the plurality of controllers is communicably connected to a respective one of the managed battery cells. Each controller includes a battery condition detector for (a) detecting certain fault or non-fault battery conditions associated with the battery included in the respective managed battery cell connected thereto, and (b) generating an indication of the detected battery condition. Each controller further includes a battery condition transmitting component (also referred to herein as a "transmitter") for transmitting the indication of a detected battery condition, a battery condition receiving component (also referred to herein as a "receiver") for receiving the indication of the detected battery condition, and a switch control module for controlling, based on the detected battery condition, the operation of the controllable switch included in the managed battery cell connected thereto.

In one mode of operation, a plurality of managed battery cells (e.g., 4, 8, 10, or any other suitable number of managed battery cells) are connected in series, and either a load or a charging voltage source is connected across the series-connected managed battery cells. Further, the controllable switch included in each managed battery cell is initially in the closed or ON state, thereby connecting the plurality of batteries included in the respective managed battery cells to a discharging circuit (if the load is connected across the series-connected managed battery cells) or a charging circuit (if the charging voltage source is connected across the series-connected managed battery cells). In the event the battery condition detector included in a respective one of the plurality of controllers detects a certain fault or non-fault battery condition associated with the battery within the managed battery cell communicably connected thereto, the battery condition detector generates an indication of the detected battery condition, and provides the indication of the detected battery condition to the transmitter within the respective controller. The transmitter transmits the indication of the detected battery condition to each of the plurality of controllers, including the respective controller of which the transmitter is a part. The receiver included in each controller receives the indication of the detected battery condition, and provides the indication of the detected battery condition to the switch control module within the controller. Based on the detected battery condition, the switch control modules included in the respective controllers generate control signals to cause the controllable switches within the respective managed battery cells to transition, substantially simultaneously, from the closed or ON state to the opened or OFF state. As a result, the batteries included in the respective managed battery cells are substantially simultaneously disconnected or otherwise isolated from the discharging circuit or the charging circuit of which the batteries were a part.

By providing a plurality of controllable switches within a plurality of series-connected managed battery cells, respectively, and using the plurality of controllable switches to disconnect or otherwise isolate, substantially simultaneously, a plurality of batteries included in the respective managed battery cells from an external circuit in response to certain fault or non-fault battery conditions, the voltages of the respective batteries become distributed among the controllable switches when synchronously transitioned from the closed or ON state to the opened or OFF state, advantageously allowing for the use of switches having a reduced voltage rating as well as a reduced cost. Further, by connecting a balancing resistor across each series-connected battery/switch pair included in the respective managed battery cells, a more even distribution of the voltages of the respective batteries among the controllable switches can be achieved, advantageously providing the system with more predictable operation.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein and, together with the Detailed Description, explain these embodiments. In the drawings:

FIG. 1a is a diagram of a conventional discharging circuit that includes a battery connected in series with a controllable switch;

FIG. 1b is a diagram of a conventional charging circuit that includes a battery connected in series with a controllable switch;

FIG. 1c is a diagram of a conventional discharging circuit that includes a plurality of series-connected battery and controllable switch pairs (each such series-connected battery and controllable switch pair also referred to herein as a "battery/switch pair");

FIG. 1d is a diagram of a conventional charging circuit that includes a plurality of battery/switch pairs;

FIG. 9 is a flow diagram of an exemplary method of operating the system of FIG. 2a.

DETAILED DESCRIPTION

Figure 2A:
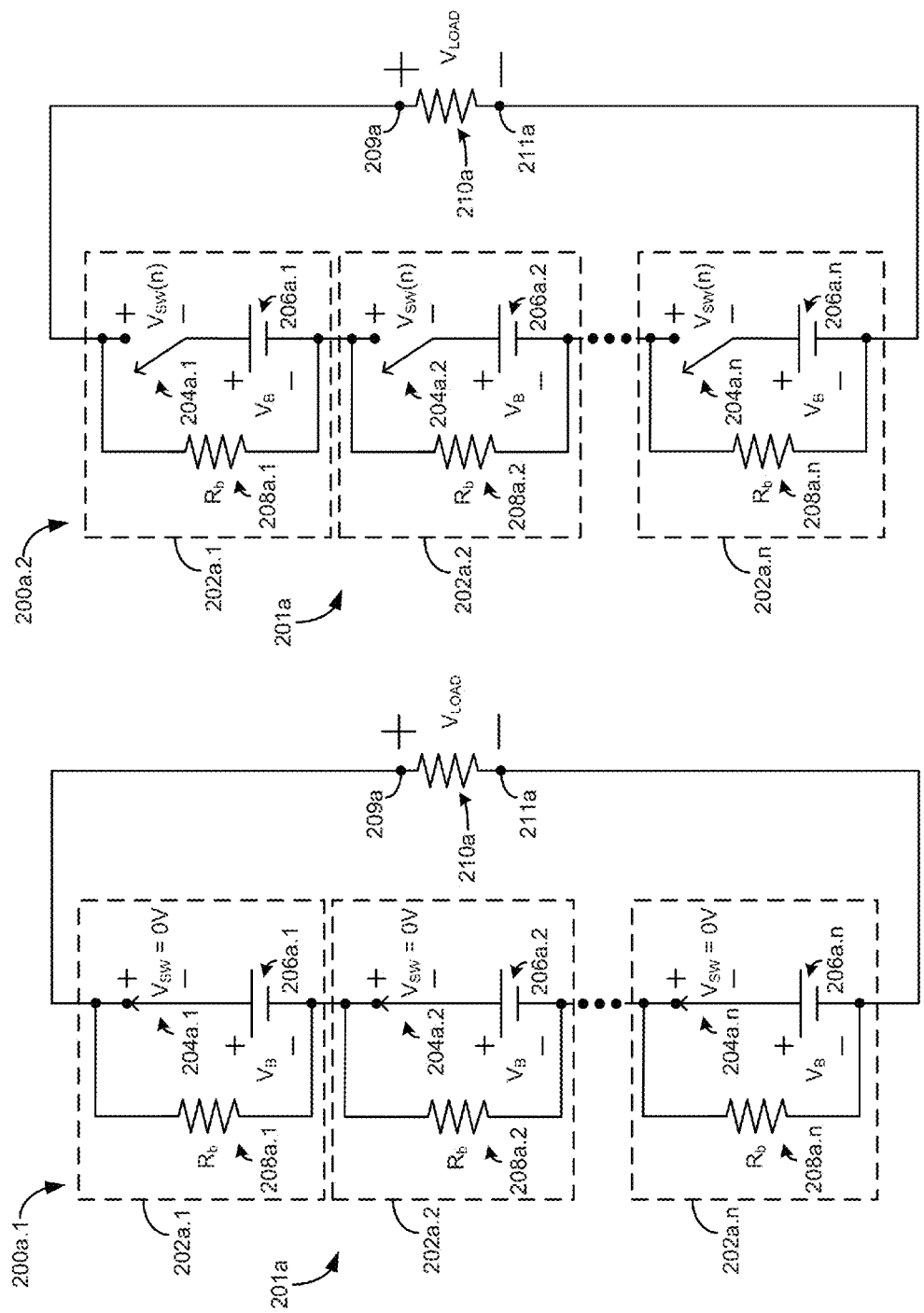
FIG. 2a is a diagram of an exemplary system for providing integrated battery protection for series-connected batteries, in accordance with the present application, as implemented in a discharging circuit, in which the discharging circuit includes a plurality of series-connected managed battery cells, each managed battery cell including a battery/switch pair and a balancing resistor connected across the battery/switch pair, each switch initially being in a closed or "ON" state, and subsequently being synchronously transitioned to an opened or "OFF" state.

Systems and methods of providing integrated battery protection for a plurality of series-connected batteries are disclosed, in which a plurality of controllable switches are employed to disconnect or otherwise isolate the respective batteries, substantially simultaneously, from an external circuit in response to certain fault or non-fault battery conditions. When the plurality of controllable switches are synchronously transitioned from a closed or "ON" state to an opened or "OFF" state, the voltage of the respective batteries becomes distributed among the controllable switches, allowing for the use of switches having a reduced voltage rating as well as a reduced cost. By connecting a balancing resistor across each of a plurality of series-connected battery/switch pairs, a more even distribution of the voltage of the respective batteries among the controllable switches can be achieved, providing the system with more predictable operation.

FIG. 1a depicts a conventional discharging circuit 100a that includes a controllable switch 102a, a battery 104a connected in series with the controllable switch 102a, and a load 106a connected across the series-connected battery 104a and controllable switch 102a. The controllable switch 102a can be controlled to transition from a closed or "ON" state to an opened or "OFF" state, thereby selectively enabling and disabling a flow of current into and out of the battery 104a. For example, the controllable switch 102a can be a relay, a contactor, an insulated gate bipolar transistor (IGBT), a metal-oxide substrate field effect transistor (MOS-FET), a bipolar junction transistor (BJT), a silicon controlled rectifier (SCR), or any other suitable controllable switch. Further, the battery 104a can be a lithium battery or any other suitable battery. In the event of a certain fault or non-fault battery condition, the controllable switch 102a can be transitioned from the closed or ON state to the opened or OFF state (see FIG. 1a) to disconnect the battery 104a from the discharging circuit 100a of which the battery 104a was a part. For example, in the discharging circuit 100a, such a battery condition might result from the battery 104a being fully discharged, having its temperature exceed a preset limit, or any other suitable fault or non-fault battery condition.

In the conventional discharging circuit 100a of FIG. 1a, when the battery 104a is disconnected from the discharging circuit 100a by the controllable switch 102a, the switch 102a can experience a voltage, $V_{SW}$, of up to the maximum voltage, $V_B$, of the battery 104a (i.e., $V_{SW}=-V_B$; see FIG. 1a). To avoid having the switch 102a experience a voltage in excess of its voltage rating (i.e., the maximum voltage that the switch 102a can tolerate while in the opened or OFF state), the switch 102a is typically selected such that its voltage rating can accommodate the maximum battery voltage when it is used to disconnect the battery 104a from the discharging circuit 100a.

FIG. 1b depicts a conventional charging circuit 100b that includes a controllable switch 102b, a battery 104b connected in series with the controllable switch 102b, and a charging voltage ($V_{CHG}$) source 106b connected across the series-connected battery 104b and controllable switch 102b. Like the controllable switch 102a (see FIG. 1a), the controllable switch 102b can be controlled to transition from a closed or "ON" state to an opened or "OFF" state, thereby selectively enabling and disabling a flow of current into and out of the battery 104b. In the event of a certain fault or non-fault battery condition, the controllable switch 102b can be transitioned from the closed or ON state to the opened or OFF state (see FIG. 1b) to disconnect the battery 104b from the charging circuit 100b of which the battery 104b was a part. For example, in the charging circuit 100b, such a battery condition might result from the battery 104b being fully charged, experiencing thermal runaway, or any other suitable fault or non-fault battery condition.

In the conventional charging circuit 100b of FIG. 1b, when the battery 104b is disconnected from the charging circuit 100b by the controllable switch 102b, the switch 102b can experience a voltage, $V_{SW}$, of up to the difference between the charging voltage, $V_{CHG}$, and the battery voltage, $V_B$ (i.e., $V_{SW}=V_{CHG}-V_B$; see FIG. 1b). To avoid having the switch 102b experience a voltage in excess of its voltage rating, the switch 102b is typically selected such that its voltage rating can accommodate the maximum charging voltage when it is used to disconnect the battery 104b from the charging circuit 100b.

FIG. 1c depicts a conventional discharging circuit 100c that includes a plurality of batteries 104c.1, 104c.2, . . . , 104c.n, a plurality of controllable switches 102c.1, 102c.2, . . . , 102c.n connected in series with the plurality of batteries 104c.1, 104c.2, . . . , 104c.n, respectively, and a load 106c connected across all of the series-connected batteries 104c.1, 104c.2, . . . , 104c.n and controllable switches 102c.1, 102c.2, . . . , 102c.n. In the event of a certain fault or non-fault battery condition, a corresponding one of the controllable switches 102c.1, 102c.2, . . . , 102c.n connected in series with the respective batteries 104c.1, 104c.2, . . . , 104c.n can be transitioned from the closed or ON state to the opened or OFF state, thereby disconnecting the plurality of batteries 104c.1, 104c.2, ..., 104c.n from the discharging circuit 100c of which the batteries 104c.1, 104c.2, ..., 104c.n were a part.

In the conventional discharging circuit 100c of FIG. 1c, when the plurality of batteries 104c.1, 104c.2, ..., 104c.n are disconnected from the discharging circuit 100c by one of the controllable switches 102c.1, 102c.2, ..., 102c.n (e.g., the controllable switch 102c.2; see FIG. 1c), the switch 102c.2 can experience a voltage of up to the sum of the voltages, $V_B + V_B + \ldots + V_B$, of all of the respective batteries 104c.1, 104c.2, ..., 104c.n (i.e., $V_{SW} = -(n \times V_B)$; see FIG. 1c). To avoid having a switch (such as the switch 102c.2) experience a voltage in excess of its voltage rating, each switch 102c.1, 102c.2, ..., 102c.n is typically selected such that its voltage rating can accommodate the sum of the maximum voltages of all of the respective batteries 104c.1, 104c.2, ..., 104c.n when it is used to disconnect the plurality of batteries 104c.1, 104c.2, ..., 104c.n from the discharging circuit 100c.

FIG. 1d depicts a conventional charging circuit 100d that includes a plurality of batteries 104d.1, 104d.2, ..., 104d.n, a plurality of controllable switches 102d.1, 102d.2, ..., 102d.n connected in series with the plurality of batteries 104d.1, 104d.2, ..., 104d.n, respectively, and a charging voltage ($V_{CHG}$) source 106d connected across all of the series-connected batteries 104d.1, 104d.2, ..., 104d.n and controllable switches 102d.1, 102d.2, ..., 102d.n. In the event of a certain fault or non-fault battery condition, a corresponding one of the controllable switches 102d.1, 102d.2, ..., 102d.n connected in series with the respective batteries 104d.1, 104d.2, ..., 104d.n can be transitioned from the closed or ON state to the opened or OFF state, thereby disconnecting the plurality of batteries 104d.1, 104d.2, ..., 104d.n from the charging circuit 100d of which the batteries 104d.1, 104d.2, ..., 104d.n were a part.

In the conventional charging circuit 100d of FIG. 1d, when the plurality of batteries 104d.1, 104d.2, ..., 104d.n are disconnected from the charging circuit 100d by one of the controllable switches (e.g., the controllable switch 102d.2), the switch 102d.2 can experience a voltage of up to the difference between the charging voltage, $V_{CHG}$, and the sum of the voltages, $V_B + V_B + \ldots + V_B$, of all of the respective batteries 104d.1, 104d.2, ..., 104d.n (i.e., $V_{SW} = V_{CHG} - (n \times V_B)$; see FIG. 1d). To avoid having a switch (such as the switch 102d.2) experience a voltage in excess of its voltage rating, each switch 102d.1, 102d.2, ..., 102d.n is typically selected such that its voltage rating can accommodate the maximum charging voltage when it is used to disconnect the plurality of batteries 104d.1, 104d.2, ..., 104d.n from the charging circuit 100d.

The conventional discharging circuits 100a, 100c (see FIGS. 1a, 1c) and the conventional charging circuits 100b, 100d (see FIGS. 1b, 1d) described herein have several drawbacks, however. For example, the cost of the controllable switches employed in such conventional circuits generally increases in proportion to the voltage rating of the respective switches, potentially making such switches prohibitively expensive for some battery management applications. Further, such switches that have increased voltage ratings typically exhibit a relatively high internal series resistance, which can result in increased losses and reduced efficiency, as well as the need for costly thermodynamic mitigations in the system design. In addition, in the conventional circuits 100c, 100d (see FIGS. 1c, 1d) that involve multiple batteries, the number of batteries employed in the respective circuits can be limited by the voltage rating of the controllable switches selected for use therein, due at least in part to the increased cost of such switches having high voltage ratings.

FIG. 2a depicts an illustrative embodiment of an exemplary system (first and second representations 200a.1, 200a.2 of which are illustrated in FIG. 2a) for providing integrated battery protection for series-connected batteries, as implemented in a discharging circuit 201a, in accordance with the present application. As shown in FIG. 2a, the discharging circuit 201a includes a plurality of managed battery cells 202a.1, 202a.2, ..., 202a.n, and a load 210a. Each of the plurality of managed battery cells 202a.1, 202a.2, ..., 202a.n includes a battery, a controllable switch, and a balancing resistor. Specifically, the managed battery cell 202a.1 includes a battery 206a.1, a controllable switch 204a.1, and a balancing resistor 208a.1. Likewise, the managed battery cell 202a.2 includes a battery 206a.2, a controllable switch 204a.2, and a balancing resistor 208a.2, and the managed battery cell 202a.n includes a battery 206a.n, a controllable switch 204a.n, and a balancing resistor 208a.n. The first representation 200a.1 of the discharging circuit 201a illustrates each of the controllable switches 204a.1, 204a.2, ..., 204a.n in the closed or ON state, causing the respective switches 204a.1, 204a.2, ..., 204a.n to experience a voltage, $V_{SW}$, equal to approximately 0 volts (i.e., $V_{SW} = 0V$). The second representation 200a.2 of the discharging circuit 201a illustrates each of the controllable switches 204a.1, 204a.2, ..., 204a.n in the opened or OFF state, causing the respective switches 204a.1, 204a.2, ..., 204a.n to experience a voltage, $V_{SW}(n)$, which is a function of the total number, n, of the managed battery cells 202a.1, 202a.2, ..., 202a.n included in the discharging circuit 201a.

In each of the plurality of managed battery cells 201a.1, 201a.2, ..., 201a.n of FIG. 2a, the battery is connected in series with the controllable switch to form a series-connected battery and controllable switch pair (such a series-connected battery and controllable switch pair also referred to herein as a "battery/switch pair"), and the balancing resistor is connected across the respective battery/switch pair. Specifically, the managed battery cell 202a.1 includes the balancing resistor 208a.1 connected across the battery/switch pair 206a.1, 204a.1. Likewise, the managed battery cell 202a.2 includes the balancing resistor 208a.2 connected across the battery/switch pair 206a.2, 204a.2, and the managed battery cell 202a.n includes the balancing resistor 208a.n connected across the battery/switch pair 206a.n, 204a.n. As shown in FIG. 2a, the plurality of managed battery cells 202a.1, 202a.2, ..., 202a.n are connected in series, and the load 210a is connected across all of the series-connected managed battery cells 202a.1, 202a.2, ..., 202a.n. For example, each controllable switch 204a.1, 204a.2, ..., 204a.n can be a relay, a contactor, an insulated gate bipolar transistor (IGBT), a metal-oxide substrate field effect transistor (MOSFET), a bipolar junction transistor (BJT), a silicon controlled rectifier (SCR), or any other suitable controllable switch. Further, each battery 206a.1, 206a.2, ..., 206a.n can be a lithium battery or any other suitable battery.

In an exemplary mode of operation of the discharging circuit 201a, the controllable switches 204a.1, 204a.2, ..., 204a.n included in the managed battery cells 202a.1, 202a.2, ..., 202a.n, respectively, are each initially in the closed or ON state (see FIG. 2a; the first representation 200a.1), thereby connecting the plurality of batteries 206a.1, 206a.2, ..., 206a.n included in the respective managed battery cells 202a.1, 202a.2, ..., 202a.n to the discharging circuit 201a. In the event a certain fault or non-fault battery condition associated with one of the plurality of batteries 206a.1, 206a.2, ..., 206a.n is detected, control signals are generated to cause the controllable switches 204a.1, 204a.2, ..., 204a.n within the respective managed battery cells 202a.1, 202a.2, ..., 202a.n to synchronously transition from the closed or ON state to the opened or OFF state (see FIG. 2a; the second representation 200a.2). As a result, the plurality of batteries 206a.1, 206a.2, ..., 206a.n included in the respective managed battery cells 202a.1, 202a.2, ..., 202a.n are substantially simultaneously disconnected or otherwise isolated from the discharging circuit 201a of which the batteries 206a.1, 206a.2, ..., 206a.n were a part.

By disconnecting or otherwise isolating, substantially simultaneously, the plurality of batteries 206a.1, 206a.2, ..., 206a.n included in the respective managed battery cells 202a.1, 202a.2, ..., 202a.n from the discharging circuit 201a in response to the detection of a certain fault or non-fault battery condition, the voltage, $V_B$, of the respective batteries 206a.1, 206a.2, ..., 206a.n becomes distributed among the controllable switches 204a.1, 204a.2, ..., 204a.n when synchronously transitioned from the closed or ON state to the opened or OFF state, allowing for the use of switches having a reduced voltage rating as well as a reduced cost.

As described herein, having transitioned from the closed or ON state to the opened or OFF state, the respective switches 204a.1, 204a.2, ..., 204a.n can experience a voltage, $V_{SW}(n)$, which is a function of the total number, n, of the managed battery cells 202a.1, 202a.2, ..., 202a.n included in the discharging circuit 201a. In one embodiment, in which the respective switches 204a.1, 204a.2, ..., 204a.n are each implemented as a MOSFET switch, the voltage, $V_{SW}(n)$, experienced by the respective switches 204a.1, 204a.2, ..., 204a.n while in the opened or OFF state can be expressed, as follows:

$$V_{SW}(n) = V_B \cdot \frac{2 \cdot n \cdot R_{FET\_max}}{(n-1) \cdot R_b + (n+1) \cdot R_{FET\_max}}, \quad (1)$$

in which "$V_B$" is the battery voltage, "$R_b$" is the value of the balancing resistor, and "$R_{FET\_max}$" is the maximum leakage impedance of the MOSFET switch. It is noted that the expression of equation (1) is based on the following assumptions: (a) the balancing resistors 208a.1, 208a.2, ..., 208a.n each have a value, $R_b$, approximately equal to the minimum leakage impedance of the MOSFET switch, (b) the value of the load 210a is much less than the value, $R_b$, of the balancing resistors 208a.1, 208a.2, ..., 208a.n, and (c) the batteries 206a.1, 206a.2, ..., 206a.n are each fully charged to the maximum battery voltage, "$V_{B\_full}$" (i.e., $V_B = V_{B\_full}$).

Figure 2B:
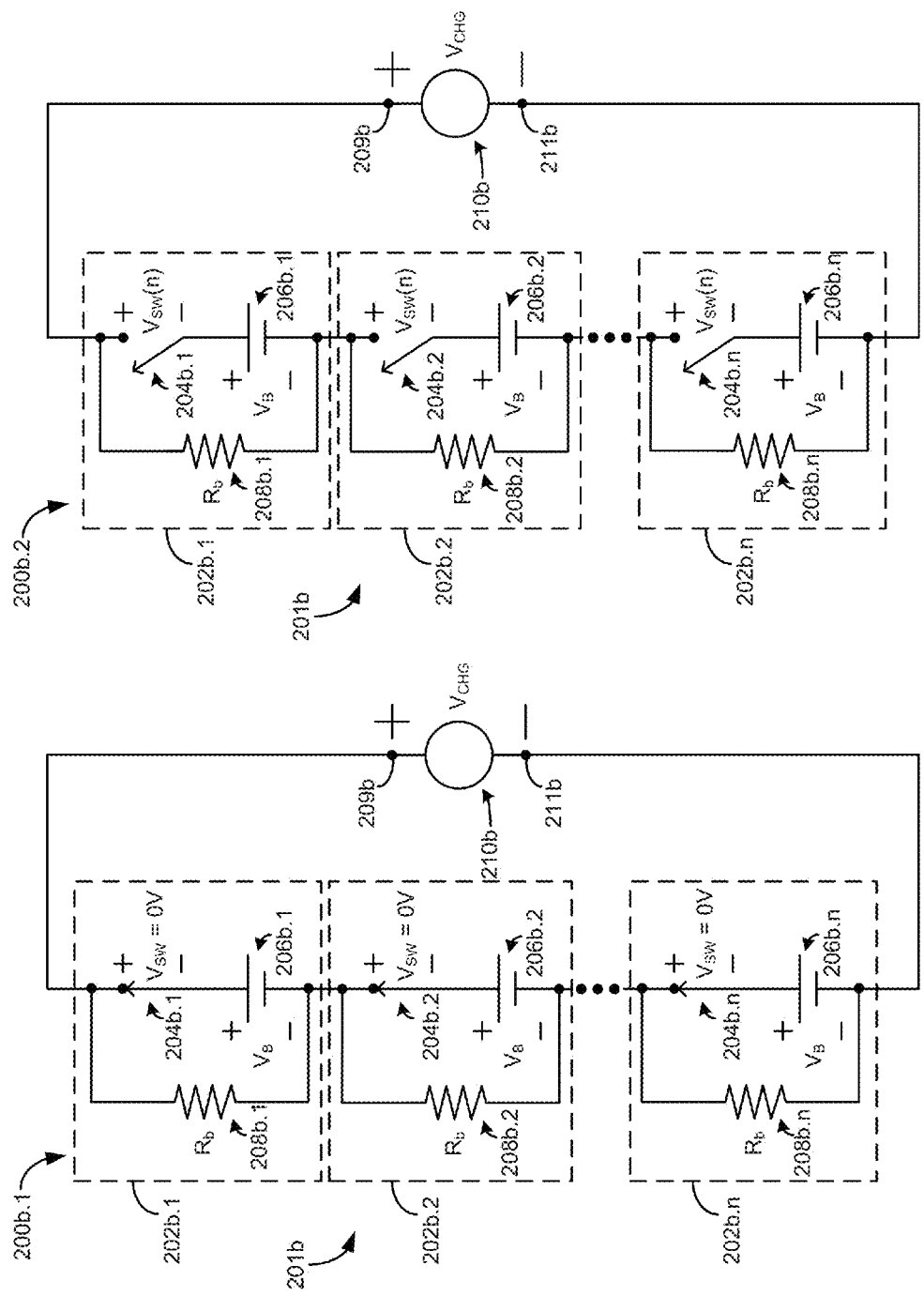
FIG. 2b is a diagram of an exemplary system for providing integrated battery protection for series-connected batteries, in accordance with the present application, as implemented in a charging circuit, in which the charging circuit includes a plurality of series-connected managed battery cells, each managed battery cell including a battery/switch pair and a balancing resistor connected across the battery/switch pair, each switch initially being in the closed or ON state, and subsequently being synchronously transitioned to the opened or OFF state.

FIG. 2b depicts an illustrative embodiment of an exemplary system (first and second representations 200b.1, 200b.2 of which are illustrated in FIG. 2b) for providing integrated battery protection for series-connected batteries, as implemented in a charging circuit 201b, in accordance with the present application. As shown in FIG. 2b, the charging circuit 201b includes a plurality of managed battery cells 202b.1, 202b.2, ..., 202b.n, and a charging voltage ($V_{CHG}$) source 210b. Each of the plurality of managed battery cells 202b.1, 202b.2, ..., 202b.n includes a battery, a controllable switch, and a balancing resistor. Specifically, the managed battery cell 202b.1 includes a battery 206b.1, a controllable switch 204b.1, and a balancing resistor 208b.1. Likewise, the managed battery cell 202b.2 includes a battery 206b.2, a controllable switch 204b.2, and a balancing resistor 208b.2, and the managed battery cell 202b.n includes a battery 206b.n, a controllable switch 204b.n, and a balancing resistor 208b.n. The first representation 200b.1 of the charging circuit 201b illustrates each of the controllable switches 204b.1, 204b.2, ..., 204b.n in the closed or ON state, causing the respective switches 204b.1, 204b.2, ..., 204b.n to experience a voltage, $V_{SW}$, equal to approximately 0 volts (i.e., $V_{SW}=0V$). The second representation 200b.2 of the charging circuit 201b illustrates each of the controllable switches 204b.1, 204b.2, ..., 204b.n in the opened or OFF state, causing the respective switches 204b.1, 204b.2, ..., 204b.n to experience a voltage, $V_{SW}(n)$, which is a function of the total number, n, of the managed battery cells 202b.1, 202b.2, ..., 202b.n included in the charging circuit 201b.

In each of the plurality of managed battery cells 201b.1, 201b.2, ..., 201b.n of FIG. 2b, the battery is connected in series with the controllable switch to form a battery/switch pair, and the balancing resistor is connected across the respective battery/switch pair. Specifically, the managed battery cell 202b.1 includes the balancing resistor 208b.1 connected across the battery/switch pair 206b.1, 204b.1. Likewise, the managed battery cell 202b.2 includes the balancing resistor 208b.2 connected across the battery/switch pair 206b.2, 204b.2, and the managed battery cell 202b.n includes the balancing resistor 208b.n connected across the battery/switch pair 206b.n, 204b.n. As shown in FIG. 2b, the plurality of managed battery cells 202b.1, 202b.2, ..., 202b.n are connected in series, and the charging voltage ($V_{CHG}$) source 210b is connected across all of the series-connected managed battery cells 202b.1, 202b.2, ..., 202b.n. For example, each controllable switch 204b.1, 204b.2, ..., 204b.n can be a relay, a contactor, an IGBT, a MOSFET, a BJT, an SCR, or any other suitable controllable switch. Further, each battery 206b.1, 206b.2, ..., 206b.n can be a lithium battery or any other suitable battery.

In an exemplary mode of operation of the charging circuit 201b, the controllable switches 204b.1, 204b.2, ..., 204b.n included in the managed battery cells 202b.1, 202b.2, ..., 202b.n, respectively, are each initially in the closed or ON state (see FIG. 2b; the first representation 200b.1), thereby connecting the plurality of batteries 206b.1, 206b.2, ..., 206b.n included in the respective managed battery cells 202b.1, 202b.2, ..., 202b.n to the charging circuit 201b. In the event a certain fault or non-fault battery condition associated with one of the plurality of batteries 206b.1, 206b.2, ..., 206b.n is detected, control signals are generated to cause the controllable switches 204b.1, 204b.2, ..., 204b.n within the respective managed battery cells 202b.1, 202b.2, ..., 202b.n to synchronously transition from the closed or ON state to the opened or OFF state (see FIG. 2b; the second representation 200b.2). As a result, the plurality of batteries 206b.1, 206b.2, ..., 206b.n included in the respective managed battery cells 202b.1, 202b.2, ..., 202b.n are substantially simultaneously disconnected or otherwise isolated from the charging circuit 201b of which the batteries 206b.1, 206b.2, ..., 206b.n were a part.

As with the discharging circuit 201a (see FIG. 2a), by disconnecting or otherwise isolating, substantially simultaneously, the plurality of batteries 206b.1, 206b.2, ..., 206b.n included in the respective managed battery cells 202b.1, 202b.2, ..., 202b.n from the charging circuit 201b (see FIG. 2b) in response to the detection of a certain fault or non-fault battery condition, the voltage, $V_B$, of the respective batteries 206b.1, 206b.2, ..., 206b.n becomes distributed among the controllable switches 204b.1, 204b.2, ..., 204b.n when synchronously transitioned from the closed or ON state to the opened or OFF state, allowing for the use of switches having a reduced voltage rating as well as a reduced cost.

As described herein, having transitioned from the closed or ON state to the opened or OFF state, the respective switches 204b.1, 204b.2, . . . , 204b.n can experience a voltage, $V_{SW}(n)$, which is a function of the total number, n, of the managed battery cells 202b.1, 202b.2, . . . , 202b.n included in the charging circuit 201b. In one embodiment, in which the respective switches 204b.1, 204b.2, . . . , 204b.n are each implemented as a MOSFET switch, the voltage, $V_{SW}(n)$, experienced by the respective switches 204b.1, 204b.2, . . . , 204b.n while in the opened or OFF state can be expressed, as follows:

$$V_{SW}(n) = (V_{B\_full} - V_B) \cdot \frac{2 \cdot n \cdot R_{FET\_max}}{(n-1) \cdot R_b + (n+1) \cdot R_{FET\_max}}, \quad (2)$$

in which "$V_B$" is the battery voltage, "$R_b$" is the value of the balancing resistor, "$R_{FET\_max}$" is the maximum leakage impedance of the MOSFET switch, and "$V_{B\_full}$" is the maximum battery voltage when fully charged. It is noted that the expression of equation (2) is based on the assumption that the balancing resistors 208b.1, 208b.2, . . . , 208b.n each have a value, $R_b$, approximately equal to the minimum leakage impedance of the MOSFET switch.

By connecting a balancing resistor ($R_b$) across each of the plurality of series-connected battery/switch pairs included in the discharging circuit 201a (see FIG. 2a) and the charging circuit 201b (see FIG. 2b), a more even distribution of the voltage, $V_B$, of the respective batteries among the controllable switches can be achieved, providing the systems with more predictable operation.

Such use of the balancing resistor ($R_b$) will be further understood with reference to the following illustrative examples involving the discharging circuit 201a (see FIG. 2a). In these examples, it is assumed that the balancing resistors 208a.1, 208a.2, . . . , 208a.n are omitted from the managed battery cells 202a.1, 202a.2, . . . , 202a.n, respectively. It is further assumed that the controllable switches 204a.1, 204a.2, . . . , 204a.n are non-ideal, and therefore exhibit a small leakage current (and a high leakage resistance) between the poles of each respective switch. If the controllable switches 204a.1, 204a.2, . . . , 204a.n each have approximately the same amount of leakage current and therefore approximately the same value of leakage resistance, then the voltage, $V_B$, of the batteries 206a.1, 206a.2, . . . , 206a.n can essentially be evenly distributed among the respective switches when synchronously transitioned from the closed or ON state to the opened or OFF state. However, if the controllable switches 204a.1, 204a.2, . . . , 204a.n do not each have approximately the same value of leakage resistance, then each respective switch can experience a voltage that is scaled in proportion to the value of its leakage resistance. It is noted that similar results may be obtained for the controllable switches 204b.1, 204b.2, . . . , 204b.n included in the managed battery cells 202b.1, 202b.2, . . . , 202b.n, respectively, of the charging circuit 201b (see FIG. 2b).

In a first illustrative example, it is assumed that the discharging circuit 201a includes four managed battery cells 202a.1, 202a.2, 202a.3, 202a.4 (n=4), and that the value of the leakage resistance of the controllable switch 204a.2 included in the managed battery cell 202a.2 is approximately 10 times the value of the leakage resistance of each of the controllable switches 204a.1, 204a.3, 204a.4 included in the managed battery cells 202a.1, 202a.3, 202a.4, respectively. When the controllable switches 204a.1-204a.4 are synchronously transitioned from the closed or ON state to the opened or OFF state, the controllable switch 204a.2 having the high value of leakage resistance can experience a voltage, $V_{SW}$, that is scaled by approximately 3 times the voltage experienced by each of the other controllable switches 204a.1, 204a.3, 204a.4.

In a second illustrative example, it is assumed that the discharging circuit 201a includes eight managed battery cells 202a.1, 202a.2, 202a.3, 202a.4, 202a.5, 202a.6, 202a.7, 202a.8 (n=8), and that the value of the leakage resistance of the controllable switch 204a.4 included in the managed battery cell 202a.4 is approximately 10 times the value of the leakage resistance of each of the controllable switches 204a.1, 204a.2, 204a.3, 204a.5, 204a.6, 204a.7, 204a.8 included in the managed battery cells 202a.1, 202a.2, 202a.3, 202a.5, 202a.6, 202a.7, 202a.8, respectively. When the controllable switches 204a.1-204a.8 are synchronously transitioned from the closed or ON state to the opened or OFF state, the controllable switch 204a.4 having the high value of leakage resistance can experience a voltage, $V_{SW}$, that is scaled by approximately 5 times the voltage experienced by each of the other controllable switches 204a.1, 204a.2, 204a.3, 204a.5, 204a.6, 204a.7, 204a.8.

To avoid such variations in the voltages experienced by the respective switches 204a.1, 204a.2, . . . , 204a.n in the discharging circuit 201a (see FIG. 2a) when synchronously transitioned from the closed or ON state to the opened or OFF state, the balancing resistor 208a.1 is connected across the battery/switch pair 206a.1, 204a.1, the balancing resistor 208a.2 is connected across the battery/switch pair 206a.2, 204a.2, the balancing resistor 208a.3 is connected across the battery/switch pair 206a.3, 204a.3, and so on, until the balancing resistor 208a.n is connected across the battery/switch pair 206a.n, 204a.n. Similarly, to avoid such variations in the voltages experienced by the respective switches 204b.1, 204b.2, . . . , 204b.n in the charging circuit 201b (see FIG. 2b), the balancing resistor 208b.1 is connected across the battery/switch pair 206b.1, 204b.1, the balancing resistor 208b.2 is connected across the battery/switch pair 206b.2, 204b.2, the balancing resistor 208b.3 is connected across the battery/switch pair 206b.3, 204b.3, and so on, until the balancing resistor 208b.n is connected across the battery/switch pair 206b.n, 204b.n.

One of ordinary skill in the art will appreciate that suitable values of the balancing resistors 208a.1, 208a.2, . . . , 208a.n employed in the discharging circuit 201a (see FIG. 2a) can be obtained by taking into account expected worst-case variations in the values of the leakage resistances of the respective switches 204a.1, 204a.2, . . . , 204a.n. In one embodiment of the discharging circuit 201a, if the value of each of the balancing resistors 208a.1, 208a.2, . . . , 208a.n is set to be equal to the value of the smallest expected leakage resistance of the respective switches 204a.1, 204a.2, . . . , 204a.n, then the highest voltage experienced by any of the switches 204a.1, 204a.2, . . . , 204a.n while in the opened or OFF state can be made to be less than about twice the battery voltage, $V_B$ (i.e., $V_{SW} < (2 \times V_B)$). In this way, the level of variations in the voltages experienced by the respective switches 204a.1, 204a.2, . . . , 204a.n of the discharging circuit 201a when synchronously transitioned from the closed or ON state to the opened or OFF state can be reduced. It is noted that similar reductions in the level of variations in the voltages experienced by the respective switches 204b.1, 204b.2, . . . , 204b.n of the charging circuit 201b (see FIG. 2b) can be achieved through the use of the balancing resistors 208b.1, 208b.2, . . . , 208b.n.

Figure 3:
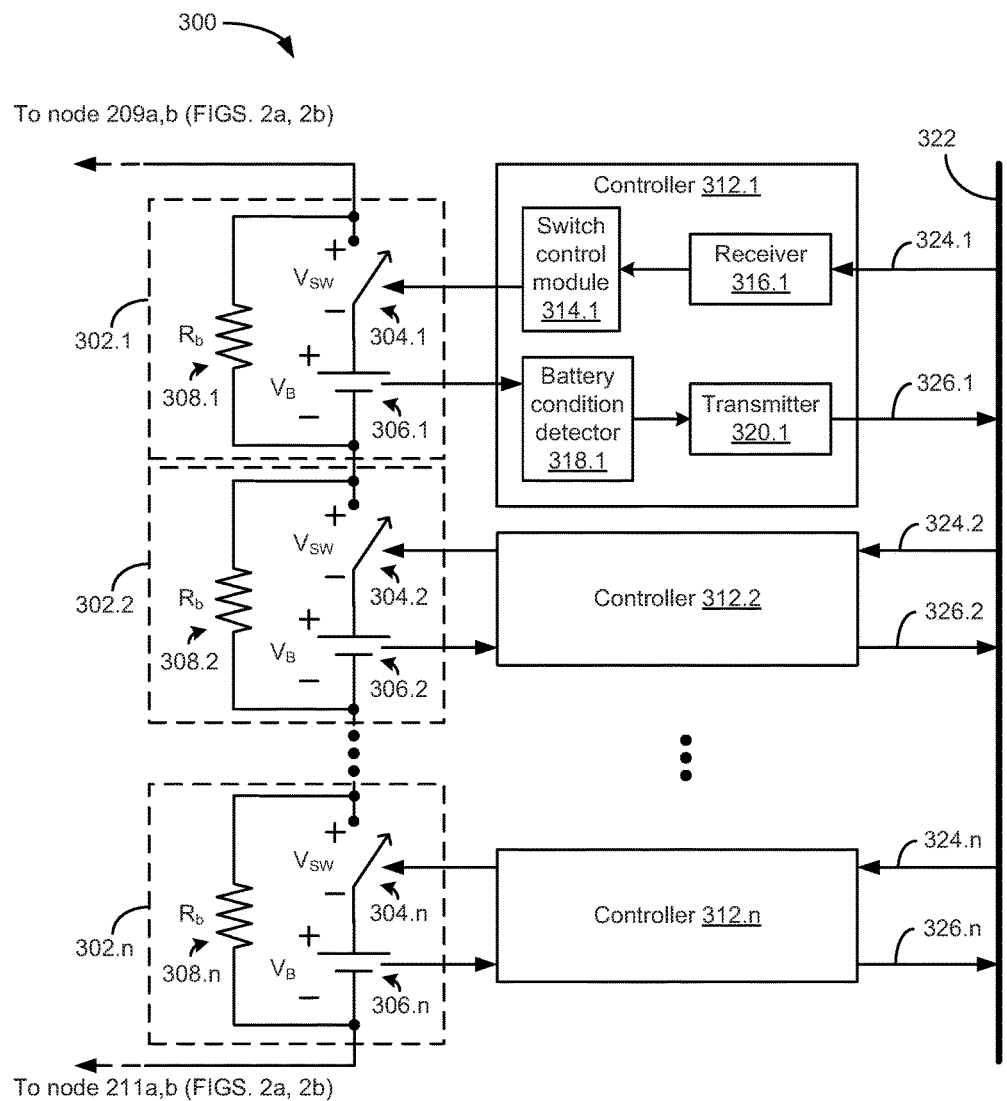
FIG. 3 is a diagram of a plurality of series-connected managed battery cells, a plurality of controllers communicably coupled to the plurality of series-connected managed battery cells, respectively, and a hardwire communication link interconnecting the respective controllers for transmitting and receiving at least one indication of a detected battery condition.

FIG. 3 depicts an illustrative embodiment of an exemplary system 300 for providing integrated battery protection for series-connected batteries, including a plurality of series-connected managed battery cells 302.1, 302.2, . . . , 302.n, a plurality of controllers 312.1, 312.2, . . . , 312.n communicably coupled to the plurality of series-connected managed battery cells 302.1, 302.2, . . . , 302.n, respectively, and a hardwire communication link 322 interconnecting the respective controllers 312.1, 312.2, . . . , 312.n for use in transmitting and receiving at least one indication of a detected battery condition. As shown in FIG. 3, each of the plurality of managed battery cells 302.1, 302.2, . . . , 302.n includes a battery, a controllable switch, and a balancing resistor. Specifically, the managed battery cell 302.1 includes a battery 306.1, a controllable switch 304.1, and a balancing resistor 308.1 connected across the battery/switch pair 306.1, 304.1. Likewise, the managed battery cell 302.2 includes a battery 306.2, a controllable switch 304.2, and a balancing resistor 308.2 connected across the battery/switch pair 306.2, 304.2, and the managed battery cell 302.n includes a battery 306.n, a controllable switch 304.n, and a balancing resistor 308.n connected across the battery/switch pair 306.n, 304.n. The plurality of managed battery cells 302.1, 302.2, . . . , 302.n are connected in series so that a load (such as the load 210a; see FIG. 2a) or a charging voltage source (such as the charging voltage source 210b; see FIG. 2b) can be connected across all of the series-connected managed battery cells 302.1, 302.2, . . . , 302.n.

As further shown in FIG. 3, each of the plurality of controllers 312.1, 312.2, . . . , 312.n includes a battery condition detector operative to detect certain fault or non-fault battery conditions, and to generate an indication of the detected battery condition. Each controller 312.1, 312.2, . . . , 312.n further includes a battery condition transmitting component (also referred to herein as a "transmitter") operative to transmit the indication of the detected battery condition, a battery condition receiving component (also referred to herein as a "receiver") operative to receive the indication of the detected battery condition, and a switch control module operative to control, based on the detected battery condition, the operation of the controllable switch included in the managed battery cell connected thereto. Specifically, the controller 312.1 includes a battery condition detector 318.1, a transmitter 320.1, a receiver 316.1, and a switch control module 314.1. Likewise, the controllers 312.2, . . . , 312.n each include a battery condition detector, a transmitter, a receiver, and a switch control module (each such battery condition detector, transmitter, receiver, and switch control module included in the respective controllers 312.2, . . . , 312.n having been omitted from FIG. 3 for clarity of illustration). For example, each battery condition detector (such as the battery condition detector 318.1) can include a temperature sensor (e.g., a thermocouple) operative to sense the temperature of a respective battery (such as the battery 306.1), as well as a temperature sensing circuit operative to generate an indication of a detected battery condition, such as the condition in which the respective battery either has its temperature exceed a preset limit or experiences thermal runaway. It is noted that each battery condition detector can include any other suitable sensor for sensing various fault and/or non-fault battery conditions.

Figure 4:
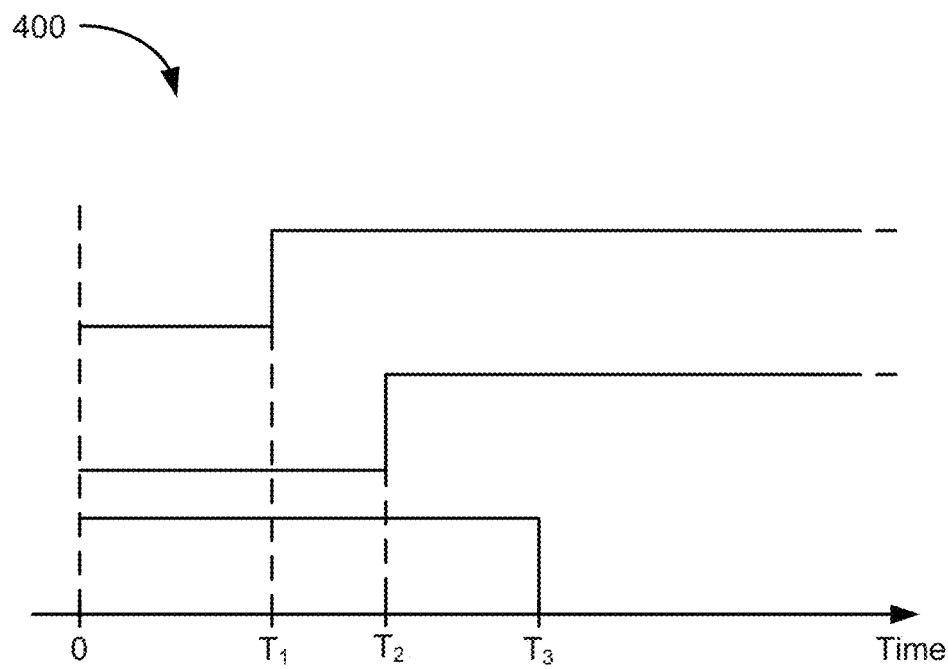
FIG. 4 is a diagram illustrating the timing of a plurality of functions that can be performed by the plurality of controllers of FIG. 3.

In an exemplary mode of operation of the system 300 (see FIG. 3), the plurality of controllable switches 304.1, 304.2, . . . , 304.n included in the plurality of managed battery cells 302.1, 302.2, . . . , 302.n, respectively, are each initially in the closed or ON state, thereby connecting the plurality of batteries 306.1, 306.2, . . . , 306.n included in the respective managed battery cells 302.1, 302.2, . . . , 302.n to an external circuit, such as a discharging circuit (if a load, such as the load 210a of FIG. 2a, is connected across the series-connected managed battery cells 302.1, 302.2, . . . , 302.n) or a charging circuit (if a charging voltage source, such as the charging voltage source 210b of FIG. 2b, is connected across the series-connected managed battery cells 302.1, 302.2, . . . , 302.n). In the event a battery condition detector, such as the battery condition detector 318.1, detects, at a time $T_1$ (see FIG. 4), a certain fault or non-fault battery condition associated with the battery 306.1 within the managed battery cell 302.1 (e.g., the temperature of the battery 306.1 may exceed a preset limit), the battery condition detector 318.1 generates an indication of the detected battery condition, and provides the indication of the detected battery condition to the transmitter 320.1. For example, the temperature sensor within the battery condition detector 318.1 may sense the battery temperature above the preset limit, and the temperature sensing circuit within the battery condition detector 318.1 may generate a signal indicative of the sensed battery temperature.

The transmitter 320.1 (see FIG. 3) within the controller 312.1 provides, at a time $T_2$ (see FIG. 4), the indication of the detected battery condition over a path 326.1 to the hardwire communication link 322, thereby transmitting the indication of the detected battery condition over the hardwire communication link 322 to each of the plurality of controllers 312.1, 312.2, . . . , 312.n (including the controller 312.1 of which the transmitter 320.1 is a part). For example, the transmitter 320.1 may be configured and arranged to convert the signal generated by the temperature sensing circuit to a predetermined voltage level, a predetermined oscillating voltage having a specified phase, frequency, or range of frequencies, or any other suitable voltage indication of the detected battery condition, and to provide the voltage indication of the detected battery condition over the path 326.1 to the hardwire communication link 322. In an alternative embodiment, the transmitter 320.1 may be configured and arranged to process, code, and/or otherwise convert the signal generated by the temperature sensing circuit to one or more binary coded words representative of the sensed battery temperature, or to any other suitable coded representation of the sensed battery temperature based on, for example, amplitude shift keying (ASK), frequency shift keying (FSK), phase shift keying (PSK), or any other suitable coding format, and to provide the coded indication of the detected battery condition over the path 326.1 to the hardwire communication link 322.

The plurality of receivers included in the respective controllers 312.1, 312.2, . . . , 312.n are each configured and arranged to receive, access, process, and/or decode the indication of the detected battery condition transmitted over the hardwire communication link 322, and to provide the indication of the detected battery condition to the switch control module connected thereto. For example, the receiver 316.1 included in the controller 312.1 can receive, over a path 324.1, the indication of the detected battery condition, and provide the indication of the detected battery condition to the switch control module 314.1. Likewise, the receivers included in the respective controllers 312.2, . . . , 312.n can receive, over paths 324.2, . . . , 324.n, the indication of the detected battery condition, and provide the indication of the detected battery condition to the switch control modules within the respective controllers 312.2, . . . , 312.n. Based on the detected battery condition, the switch control modules included in the respective controllers 312.1, 312.2, ..., 312.n generate control signals to cause the controllable switches within the respective managed battery cells 302.1, 302.2, ..., 302.n connected thereto to transition, substantially simultaneously at a time $T_3$ (see FIG. 4), from the closed or ON state to the opened or OFF state. As a result, the batteries 306.1, 306.2, ..., 306.n included in the respective managed battery cells 302.1, 302.2, ..., 302.n are substantially simultaneously disconnected or otherwise isolated from the discharging circuit or the charging circuit of which the batteries 306.1, 306.2, ..., 306.n were a part.

Having described the above illustrative embodiments of the disclosed systems for providing integrated battery protection for series-connected batteries, other alternative embodiments or variations may be made. For example, it was described herein that a transmitter within a respective controller (such as the transmitter 320.1 within the controller 312.1; see FIG. 3) can provide an indication of a detected battery condition to a hardwire communication link, thereby transmitting the indication of the detected battery condition over the hardwire communication link to each of the plurality of controllers 312.1, 312.2, ..., 312.n (including the controller 312.1 of which the transmitter 320.1 is a part). In an alternative embodiment, a transmitter within a respective controller can transmit an indication of a detected battery condition to a plurality of controllers by affecting the nearby electromagnetic (EM) field.

Figure 5:
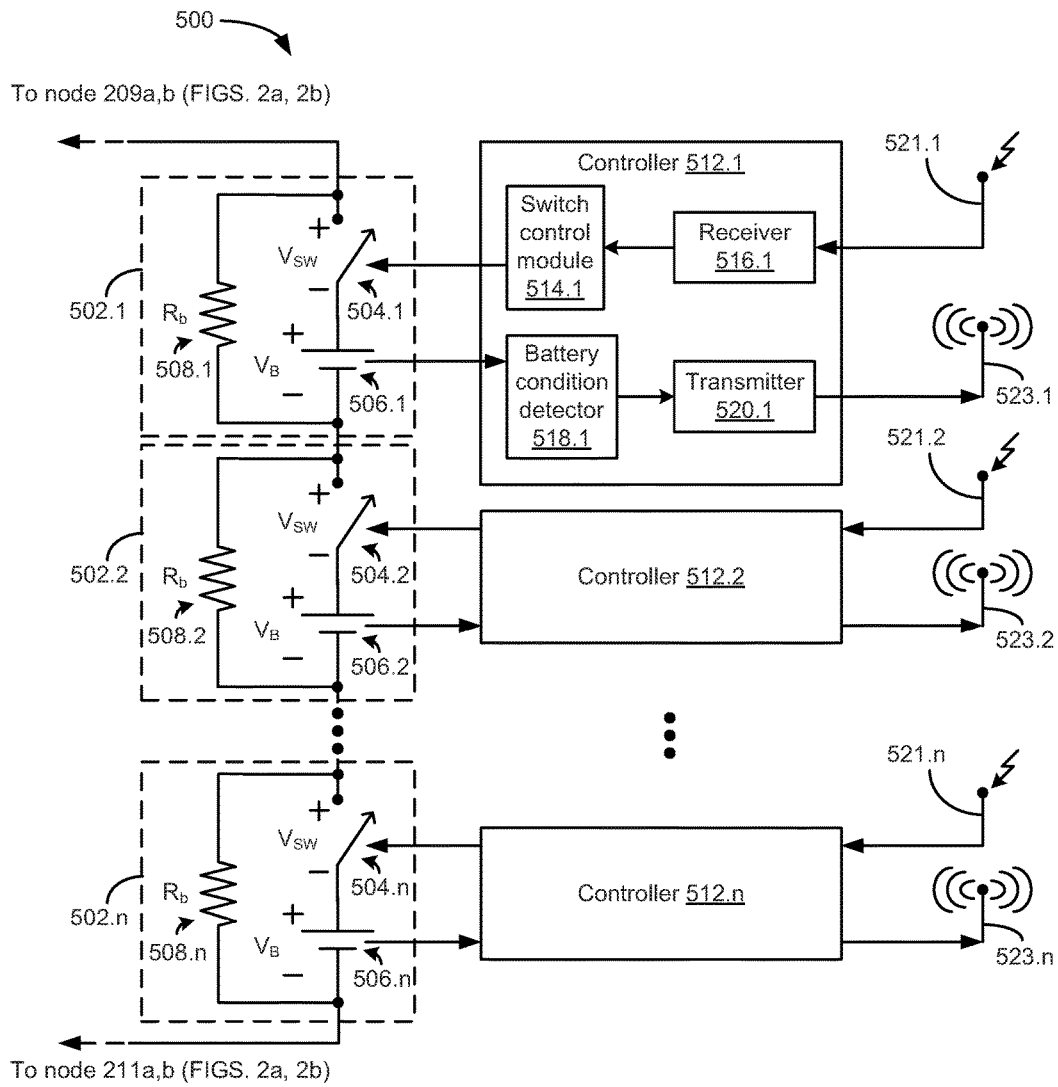
FIG. 5 is a diagram of a plurality of series-connected managed battery cells, and a plurality of controllers communicably coupled to the plurality of series-connected managed battery cells, respectively, each controller being connected to a pair of antennas for transmitting and receiving, respectively, at least one indication of a detected battery condition.

FIG. 5 depicts an illustrative embodiment of an exemplary system 500 for providing integrated battery protection for series-connected batteries, including a plurality of series-connected managed battery cells 502.1, 502.2, ..., 502.n, and a plurality of controllers 512.1, 512.2, ..., 512.n communicably coupled to the plurality of series-connected managed battery cells 502.1, 502.2, ..., 502.n, respectively. The managed battery cell 502.1 includes a battery 506.1, a controllable switch 504.1, and a balancing resistor 508.1 connected across the battery/switch pair 506.1, 504.1. Likewise, the managed battery cell 502.2 includes a battery 506.2, a controllable switch 504.2, and a balancing resistor 508.2 connected across the battery/switch pair 506.2, 504.2, and the managed battery cell 502.n includes a battery 506.n, a controllable switch 504.n, and a balancing resistor 508.n connected across the battery/switch pair 506.n, 504.n. The plurality of managed battery cells 502.1, 502.2, ..., 502.n are connected in series so that a load (such as the load 210a; see FIG. 2a) or a charging voltage source (such as the charging voltage source 210b; see FIG. 2b) can be connected across all of the series-connected managed battery cells 502.1, 502.2, ..., 502.n. The controller 512.1 includes a battery condition detector 518.1, a transmitter 520.1, a receiver 516.1, and a switch control module 514.1. Likewise, the controllers 512.2, ..., 512.n each include a battery condition detector, a transmitter, a receiver, and a switch control module (each such battery condition detector, transmitter, receiver, and switch control module included in the respective controllers 512.2, ..., 512.n having been omitted from FIG. 5 for clarity of illustration).

In the system 500 of FIG. 5, the transmitters within the respective controllers (such as the transmitter 520.1 within the controller 512.1) can each transmit an indication of a detected battery condition to the plurality of controllers 512.1, 512.2, ..., 512.n by affecting the nearby electromagnetic (EM) field. To that end, the transmitters within the respective controllers 512.1, 512.2, ..., 512.n are each connected to a transmitting antenna. Specifically, the transmitter 520.1 within the controller 512.1 is connected to a transmitting antenna 523.1. Likewise, the transmitter within the controller 512.2 is connected to a transmitting antenna 523.2, and the transmitter within the controller 512.n is connected to a transmitting antenna 523.n. For example, a respective transmitter may be configured and arranged to transmit the indication of a detected battery condition, via the transmitting antenna connected thereto, by affecting (a) the magnitude of the nearby EM field using amplitude modulation (AM), (b) an oscillating frequency associated with the nearby EM field using frequency modulation (FM), (c) a phase associated with the nearby EM field using phase modulation (PM), or any other suitable characteristic of the nearby EM field. In a further alternative embodiment, the respective transmitter may be configured and arranged to affect the nearby EM field using a predetermined timed sequence of differentiated conditions of the EM field based on, for example, amplitude shift keying (ASK), frequency shift keying (FSK), phase shift keying (PSK), etc.

The plurality of receivers included in the respective controllers 512.1, 512.2, ..., 512.n are each connected to a receiving antenna. Specifically, the receiver 516.1 within the controller 512.1 is connected to a receiving antenna 521.1. Likewise, the receiver within the controller 512.2 is connected to a receiving antenna 521.2, and the receiver within the controller 512.n is connected to a receiving antenna 521.n. Each of the plurality of receivers is configured and arranged to receive, access, process, and/or decode the indication of the detected battery condition transmitted via the respective transmitting antenna, and to provide the indication of the detected battery condition to the switch control module connected thereto. Based on the detected battery condition, the switch control modules included in the respective controllers 512.1, 512.2, ..., 512.n generate control signals to cause the controllable switches within the respective managed battery cells 502.1, 502.2, ..., 502.n connected thereto to transition, substantially simultaneously, from the closed or ON state to the opened or OFF state, thereby disconnecting or otherwise isolating the batteries 506.1, 506.2, ..., 506.n from the external circuit of which the batteries 506.1, 506.2, ..., 506.n were a part.

Figure 6:
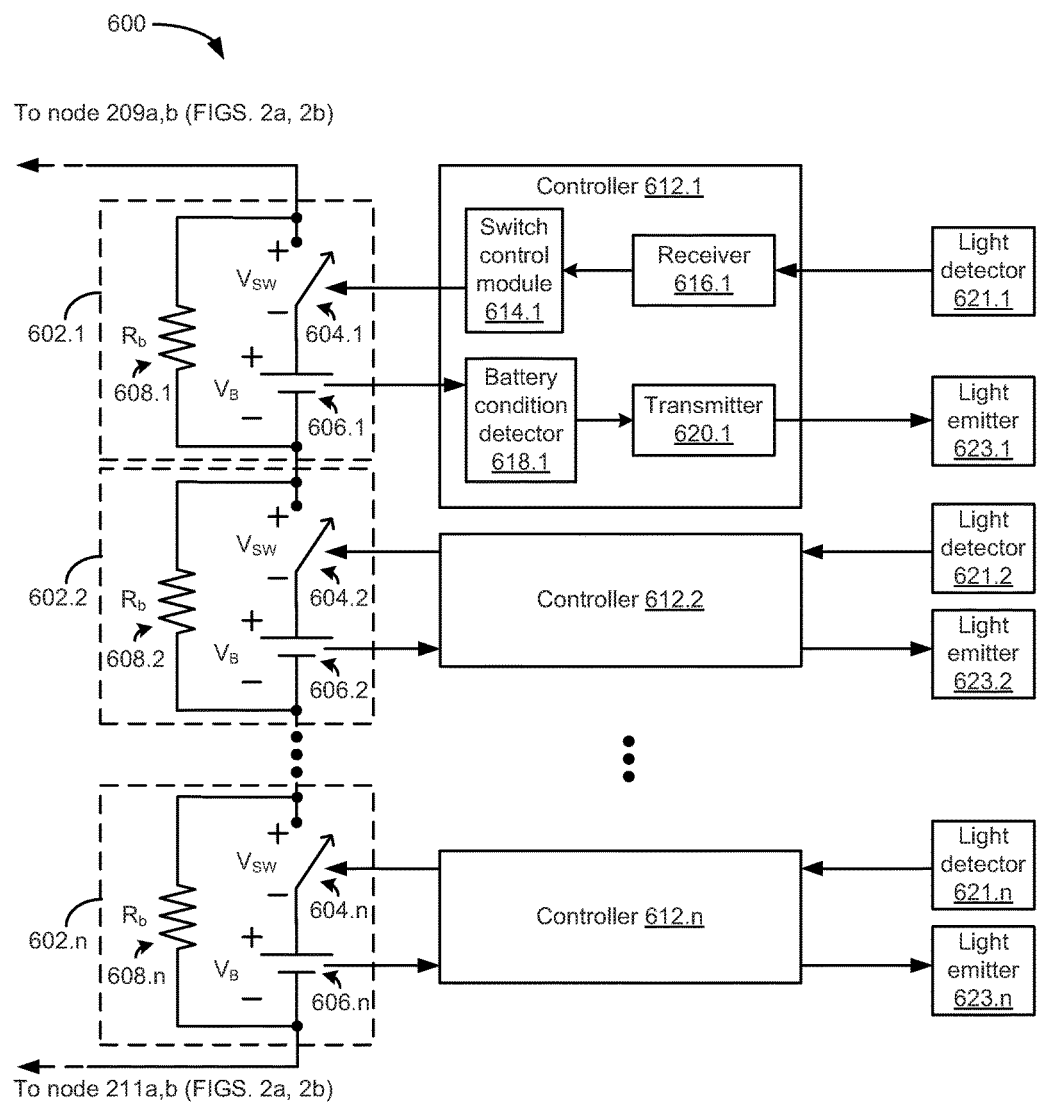
FIG. 6 is a diagram of a plurality of series-connected managed battery cells, and a plurality of controllers communicably coupled to the plurality of series-connected managed battery cells, respectively, each controller being connected to a light emitter and a light detector for transmitting and receiving, respectively, at least one indication of a detected battery condition.

FIG. 6 depicts an illustrative embodiment of another exemplary system 600 for providing integrated battery protection for series-connected batteries, in which a plurality of transmitters can each transmit an indication of a detected battery condition to a plurality of controllers by affecting the nearby electromagnetic (EM) field. The system 600 includes a plurality of series-connected managed battery cells 602.1, 602.2, ..., 602.n, and a plurality of controllers 612.1, 612.2, ..., 612.n communicably coupled to the plurality of series-connected managed battery cells 602.1, 602.2, ..., 602.n, respectively. The managed battery cell 602.1 includes a battery 606.1, a controllable switch 604.1, and a balancing resistor 608.1 connected across the battery/switch pair 606.1, 604.1. Likewise, the managed battery cell 602.2 includes a battery 606.2, a controllable switch 604.2, and a balancing resistor 608.2 connected across the battery/switch pair 606.2, 604.2, and the managed battery cell 602.n includes a battery 606.n, a controllable switch 604.n, and a balancing resistor 608.n connected across the battery/switch pair 606.n, 604.n. The plurality of managed battery cells 602.1, 602.2, ..., 602.n are connected in series so that a load (such as the load 210a; see FIG. 2a) or a charging voltage source (such as the charging voltage source 210b; see FIG. 2b) can be connected across all of the series-connected managed battery cells 602.1, 602.2, ..., 602.n. The controller 612.1 includes a battery condition detector 618.1, a transmitter 620.1, a receiver 616.1, and a switch control module 614.1. Likewise, the controllers 612.2, . . . , 612.$n$ each include a battery condition detector, a transmitter, a receiver, and a switch control module (each such battery condition detector, transmitter, receiver, and switch control module included in the respective controllers 612.2, . . . , 612.$n$ having been omitted from FIG. 6 for clarity of illustration).

In the system 600 of FIG. 6, the transmitters within the respective controllers (such as the transmitter 620.1 within the controller 612.1) can each transmit an indication of a detected battery condition to the plurality of controllers 612.1, 612.2, . . . , 612.$n$ by affecting the nearby electromagnetic (EM) field. To that end, the transmitters within the respective controllers 612.1, 612.2, . . . , 612.$n$ are each connected to a visible or invisible light emitter, such as a light-emitting diode (LED) or any other suitable light emitter. Specifically, the transmitter 620.1 within the controller 612.1 is connected to a light emitter 623.1. Likewise, the transmitter within the controller 612.2 is connected to a light emitter 623.2, and the transmitter within the controller 612.$n$ is connected to a light emitter 623.$n$. For example, a respective transmitter may be configured and arranged to transmit the indication of a detected battery condition, via the light emitter connected thereto, as EM radiation in the form of visible or invisible light. Further, the visible or invisible light may be emitted in an open space in the vicinity of the system 600, in a confined region adjacent the system 600, or through a fiber optic cable or any other suitable light-conducting medium. The light emitter may affect the nearby EM field using amplitude modulation (AM), frequency modulation (FM), or any other suitable modulation of the nearby EM field. In a further alternative embodiment, the respective transmitter may be configured and arranged to affect the nearby EM field using a predetermined timed sequence of differentiated conditions of the EM field based on, for example, amplitude shift keying (ASK), frequency shift keying (FSK), phase shift keying (PSK), etc.

The plurality of receivers included in the respective controllers 612.1, 612.2, . . . , 612.$n$ are each connected to a visible or invisible light detector, such as a photodiode, a photodetector, or any other suitable light detector. Specifically, the receiver 616.1 within the controller 612.1 is connected to a light detector 621.1. Likewise, the receiver within the controller 612.2 is connected to a light detector 621.2, and the receiver within the controller 612.$n$ is connected to a light detector 621.$n$. Each of the plurality of receivers is configured and arranged to receive, access, process, and/or decode the indication of the detected battery condition transmitted via the respective light emitter, and to provide the indication of the detected battery condition to the switch control module connected thereto. Based on the detected battery condition, the switch control modules included in the respective controllers 612.1, 612.2, . . . , 612.$n$ generate control signals to cause the controllable switches within the respective managed battery cells 602.1, 602.2, . . . , 602.$n$ connected thereto to transition, substantially simultaneously, from the closed or ON state to the opened or OFF state, thereby disconnecting or otherwise isolating the batteries 606.1, 606.2, . . . , 606.$n$ from the external circuit of which the batteries 606.1, 606.2, . . . , 606.$n$ were a part.

Figure 7:
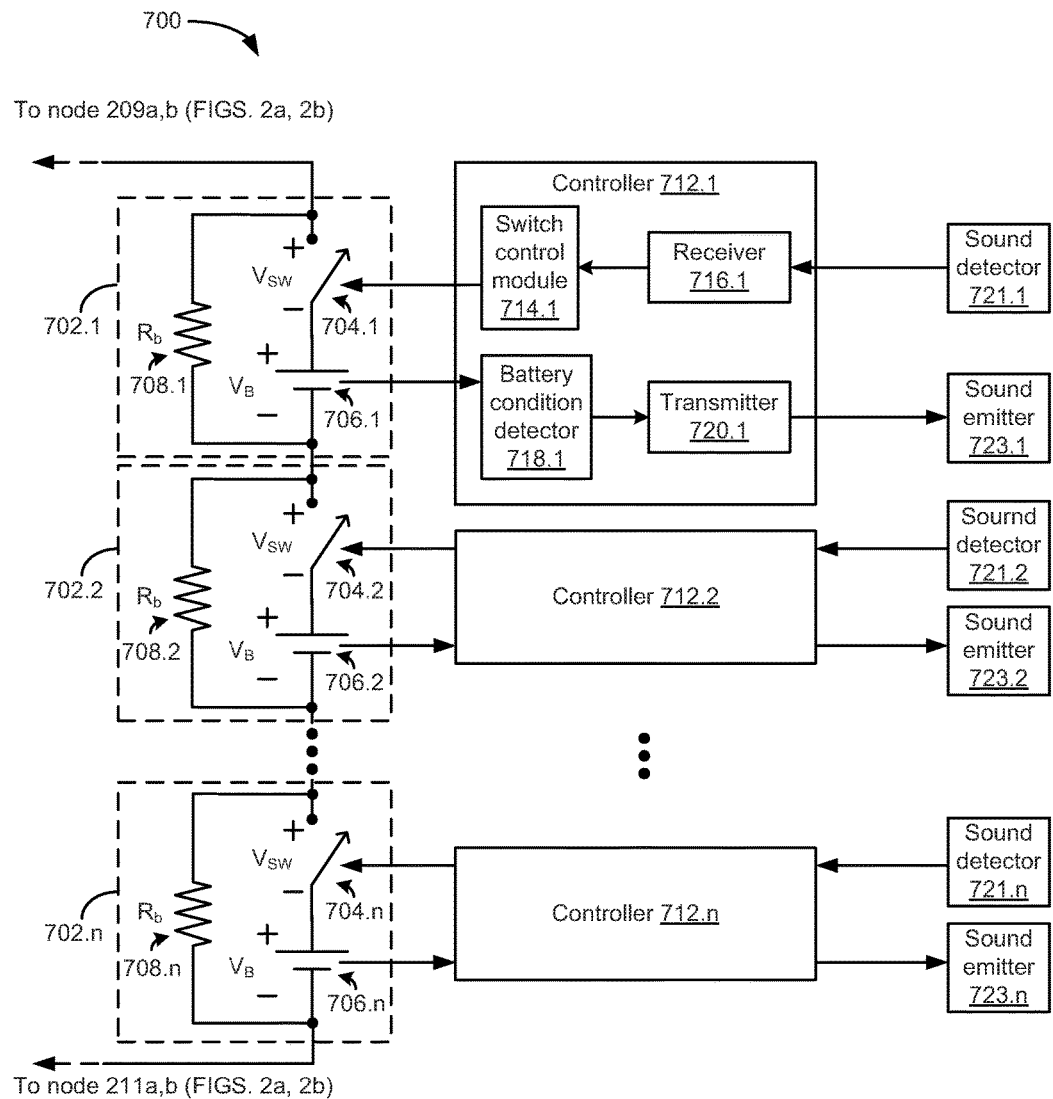
FIG. 7 is a diagram of a plurality of series-connected managed battery cells, and a plurality of controllers communicably coupled to the plurality of series-connected managed battery cells, respectively, each controller being connected to a sound emitter and a sound detector for transmitting and receiving, respectively, at least one indication of a detected battery condition.

FIG. 7 depicts an illustrative embodiment of an exemplary system 700 for providing integrated battery protection for series-connected batteries, in which a plurality of transmitters can each transmit an indication of a detected battery condition to a plurality of controllers by affecting the nearby acoustic field. The system 700 includes a plurality of series-connected managed battery cells 702.1, 702.2, . . . , 702.$n$, and a plurality of controllers 712.1, 712.2, . . . , 712.$n$ communicably coupled to the plurality of series-connected managed battery cells 702.1, 702.2, . . . , 702.$n$, respectively. The managed battery cell 702.1 includes a battery 706.1, a controllable switch 704.1, and a balancing resistor 708.1 connected across the battery/switch pair 706.1, 704.1. Likewise, the managed battery cell 702.2 includes a battery 706.2, a controllable switch 704.2, and a balancing resistor 708.2 connected across the battery/switch pair 706.2, 704.2, and the managed battery cell 702.$n$ includes a battery 706.$n$, a controllable switch 704.$n$, and a balancing resistor 708.$n$ connected across the battery/switch pair 706.$n$, 704.$n$. The plurality of managed battery cells 702.1, 702.2, . . . , 702.$n$ are connected in series so that a load (such as the load 210$a$; see FIG. 2$a$) or a charging voltage source (such as the charging voltage source 210$b$; see FIG. 2$b$) can be connected across all of the series-connected managed battery cells 702.1, 702.2, . . . , 702.$n$. The controller 712.1 includes a battery condition detector 718.1, a transmitter 720.1, a receiver 716.1, and a switch control module 714.1. Likewise, the controllers 712.2, . . . , 712.$n$ each include a battery condition detector, a transmitter, a receiver, and a switch control module (each such battery condition detector, transmitter, receiver, and switch control module included in the respective controllers 712.2, . . . , 712.$n$ having been omitted from FIG. 7 for clarity of illustration).

In the system 700 of FIG. 7, the transmitters within the respective controllers (such as the transmitter 720.1 within the controller 712.1) can each transmit an indication of a detected battery condition to the plurality of controllers 712.1, 712.2, . . . , 712.$n$ by affecting the nearby acoustic field. To that end, the transmitters within the respective controllers 712.1, 712.2, . . . , 712.$n$ are each connected to a sound emitter or speaker, such as an audible sound emitter or speaker, an ultrasonic sound emitter or speaker, or any other suitable sound emitter or speaker. Specifically, the transmitter 720.1 within the controller 712.1 is connected to a sound emitter 723.1. Likewise, the transmitter within the controller 712.2 is connected to a sound emitter 723.2, and the transmitter within the controller 712.$n$ is connected to a sound emitter 723.$n$. For example, a respective transmitter may be configured and arranged to transmit the indication of a detected battery condition, via the sound emitter connected thereto, as acoustic radiation in the form of audible or ultrasonic sound emissions. Further, the audible or ultrasonic sound may be emitted in an open space in the vicinity of the system 700, in a confined region adjacent the system 700, or through a sonic tube or any other suitable sound-conducting medium. The audible or ultrasonic sound emitter may affect the nearby acoustic field using amplitude modulation (AM), frequency modulation (FM), or any other suitable modulation of the nearby acoustic field. In a further alternative embodiment, the respective transmitter may be configured and arranged to affect the nearby acoustic field using a predetermined timed sequence of differentiated conditions of the acoustic field based on, for example, amplitude shift keying (ASK), frequency shift keying (FSK), phase shift keying (PSK), etc.

The plurality of receivers included in the respective controllers 712.1, 712.2, . . . , 712.$n$ are each connected to a sound detector or microphone, such as an audible sound detector or microphone, an ultrasonic sound detector or microphone, or any other suitable sound detector or microphone. Specifically, the receiver 716.1 within the controller 712.1 is connected to a sound detector 721.1. Likewise, the receiver within the controller 712.2 is connected to a sound detector 721.2, and the receiver within the controller 712.*n* is connected to a sound detector 721.*n*. Each of the plurality of receivers is configured and arranged to receive, access, process, and/or decode the indication of the detected battery condition transmitted via the respective sound emitter, and to provide the indication of the detected battery condition to the switch control module connected thereto. Based on the detected battery condition, the switch control modules included in the respective controllers 712.1, 712.2, . . . , 712.*n* generate control signals to cause the controllable switches within the respective managed battery cells 702.1, 702.2, . . . , 702.*n* connected thereto to transition, substantially simultaneously, from the closed or ON state to the opened or OFF state, thereby disconnecting or otherwise isolating the batteries 706.1, 706.2, . . . , 706.*n* from the external circuit of which the batteries 706.1, 706.2, . . . , 706.*n* were a part.

Figure 8:
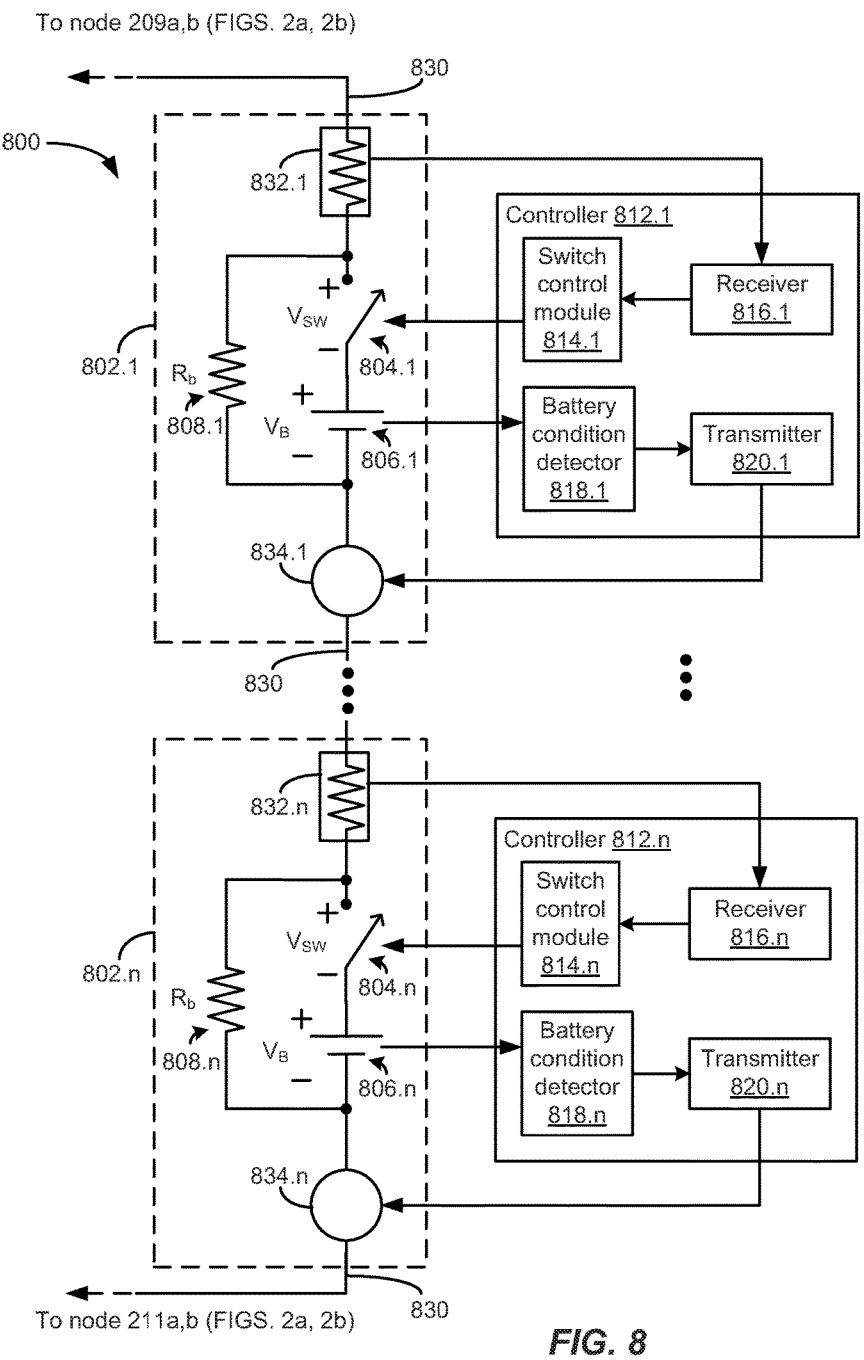
FIG. 8 is a diagram of a plurality of series-connected managed battery cells, and a plurality of controllers communicably coupled to the plurality of series-connected managed battery cells, respectively, in which each managed battery cell includes a current transformer or variable resistor as well as a current sensor, each controller being connected to the current transformer or variable resistor and the current sensor of a managed battery cell for transmitting and receiving, respectively, at least one indication of a detected battery condition.

FIG. 8 depicts an illustrative embodiment of an exemplary system 800 for providing integrated battery protection for series-connected batteries, in which a plurality of transmitters can each transmit an indication of a detected battery condition through a main power path 830 interconnecting the series-connected batteries. The system 800 includes a plurality of series-connected managed battery cells 802.1, . . . , 802.*n*, and a plurality of controllers 812.1, . . . , 812.*n* communicably coupled to the plurality of series-connected managed battery cells 802.1, . . . , 802.*n*, respectively. The managed battery cell 802.1 includes a battery 806.1, a controllable switch 804.1, a balancing resistor 808.1 connected across the battery/switch pair 806.1, 804.1, a current sensor 832.1, and a current transformer or variable resistor 834.1. Likewise, the managed battery cell 802.*n* includes a battery 806.*n*, a controllable switch 804.*n*, a balancing resistor 808.*n* connected across the battery/switch pair 806.*n*, 804.*n*, a current sensor 832.*n*, and a current transformer or variable resistor 834.*n*. The plurality of managed battery cells 802.1, . . . , 802.*n* are connected in series so that a load (such as the load 210*a*; see FIG. 2*a*) or a charging voltage source (such as the charging voltage source 210*b*; see FIG. 2*b*) can be connected across all of the series-connected managed battery cells 802.1, . . . , 802.*n*. The controller 812.1 includes a battery condition detector 818.1, a transmitter 820.1, a receiver 816.1, and a switch control module 814.1. Likewise, the controller 812.*n* includes a battery condition detector 818.*n*, a transmitter 820.*n*, a receiver 816.*n*, and a switch control module 814.*n*.

In the system 800 of FIG. 8, the transmitters 820.1, . . . , 820.*n* within the respective controllers 812.1, . . . , 812.*n* (such as the transmitter 820.1 within the controller 812.1) can each transmit an indication of a detected battery condition to the plurality of controllers 812.1, . . . , 812.*n* by affecting the flow of current through the main power path 830. To that end, the transmitters 820.1, . . . , 820.*n* within the respective controllers 812.1, . . . , 812.*n* are each connected to a current transformer or variable resistor within the managed battery cell connected thereto. Specifically, the transmitter 820.1 within the controller 812.1 is connected to the current transformer or variable resistor 834.1 within the managed battery cell 802.1. Likewise, the transmitter 820.*n* within the controller 812.*n* is connected to the current transformer or variable resistor 834.*n* within the managed battery cell 802.*n*. For example, a respective transmitter may be configured and arranged to transmit the indication of a detected battery condition, via the current transformer or variable resistor connected thereto, as a specified level of current using amplitude modulation (AM), a specified frequency of oscillating current using frequency modulation (FM), a specified phase of oscillating current using phase modulation (PM), or any other suitable modulation of the flow of current through the main power path 830. In a further alternative embodiment, the respective transmitter may be configured and arranged to transmit the indication of a detected battery condition, via the current transformer or variable resistor connected thereto, using a predetermined timed sequence of differentiated conditions of the flow of current based on, for example, amplitude shift keying (ASK), frequency shift keying (FSK), phase shift keying (PSK), etc.

The plurality of receivers included in the respective controllers 812.1, . . . , 812.*n* are each connected to a current sensor within the managed battery cell connected thereto. Specifically, the receiver 816.1 within the controller 812.1 is connected to the current sensor 832.1 within the managed battery cell 802.1. Likewise, the receiver 816.*n* within the controller 812.*n* is connected to the current sensor 832.*n* within the managed battery cell 802.*n*. Each of the plurality of receivers is configured and arranged to receive, access, process, and/or decode the indication of the detected battery condition provided by the respective current sensor, and to provide the indication of the detected battery condition to the switch control module connected thereto. Based on the detected battery condition, the switch control modules 814.1, . . . , 814.*n* included in the respective controllers 812.1, . . . , 812.*n* generate control signals to cause the controllable switches 804.1, . . . , 804.*n* within the respective managed battery cells 802.1, . . . , 802.*n* connected thereto to transition, substantially simultaneously, from the closed or ON state to the opened or OFF state, thereby disconnecting or otherwise isolating the batteries 806.1, . . . , 806.*n* from the external circuit of which the batteries 806.1, . . . , 806.*n* were a part.

Figure 9:
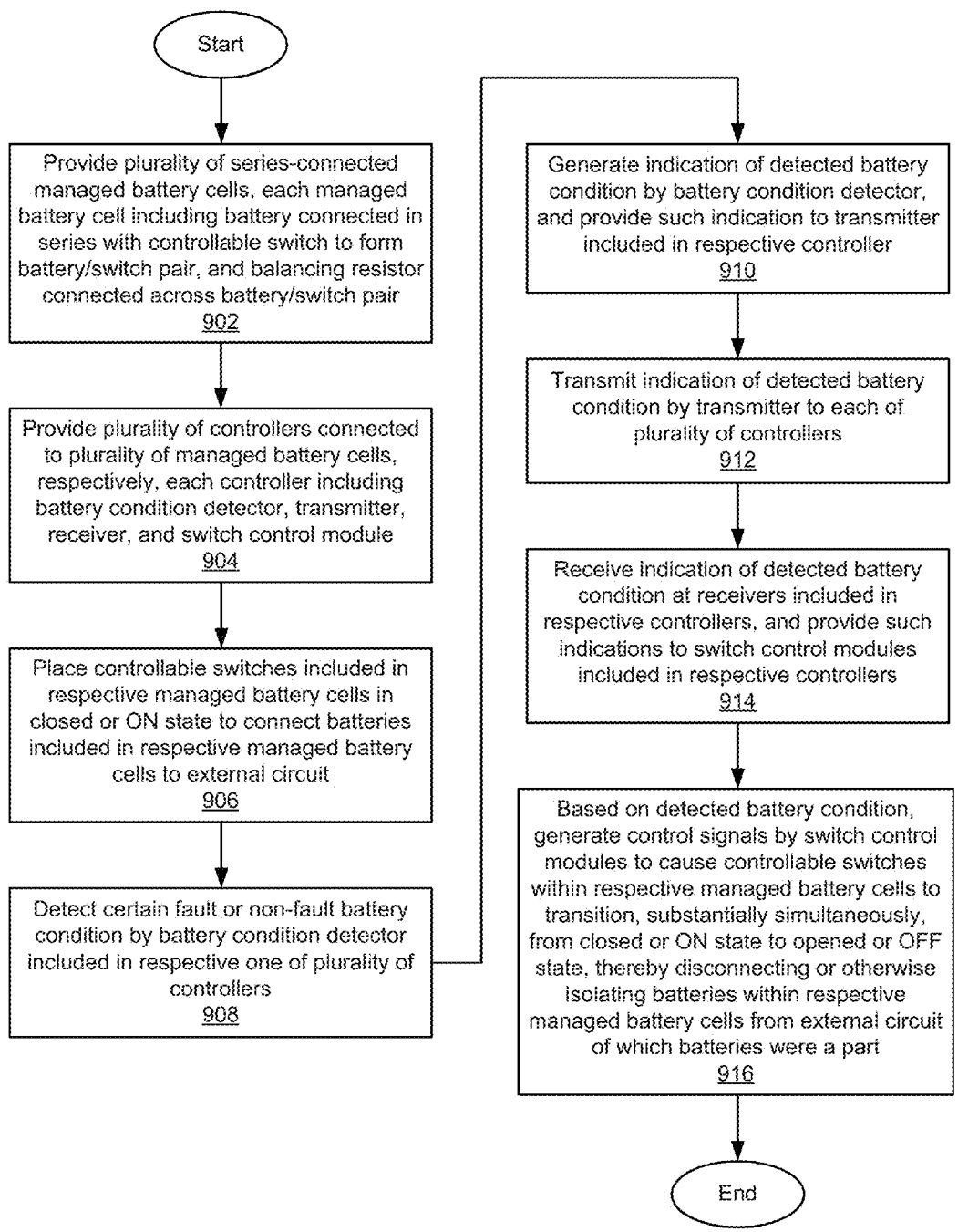

An exemplary method of operating the disclosed system of providing integrated battery protection for a plurality of series-connected batteries is described below with reference to FIG. 9. As depicted in block 902, a plurality of series-connected managed battery cells are provided, in which each managed battery cell includes a battery connected in series with a controllable switch to form a battery/switch pair, and a balancing resistor connected across the battery/switch pair. As depicted in block 904, a plurality of controllers connected to the plurality of managed battery cells, respectively, are provided, in which each controller includes a battery condition detector, a transmitter, a receiver, and a switch control module. As depicted in block 906, the controllable switches included in the respective managed battery cells are initially placed in a closed or "ON" state to connect the batteries included in the respective managed battery cells to an external circuit. As depicted in block 908, a certain fault or non-fault battery condition is detected by the battery condition detector included in a respective one of the plurality of controllers. As depicted in block 910, an indication of the detected battery condition is generated by the battery condition detector, and provided to the transmitter included in the respective controller. As depicted in block 912, the indication of the detected battery condition is transmitted by the transmitter to each of the plurality of controllers. As depicted in block 914, the indication of the detected battery condition is received at the receivers included in the respective controllers, and provided to the switch control modules included in the respective controllers. As depicted in block 916, based on the detected battery condition, control signals are generated by the switch control modules to cause the controllable switches within the respective managed battery cells to transition, substantially simultaneously, from the closed or ON state to an opened or "OFF" state, thereby disconnecting or otherwise isolating the batteries within the respective managed battery cells from the external circuit of which the batteries were a part.

It will be appreciated by those of ordinary skill in the art that further modifications to and variations of the above-described systems and methods may be made without departing from the inventive concepts disclosed herein. Accordingly, the disclosed invention should not be viewed as limited except as by the scope and spirit of the appended claims.

What is claimed is:

1. A system for providing integrated battery protection for a plurality of series-connected batteries, comprising:
  a plurality of managed battery cells including (1) a plurality of batteries, respectively, and (2) a plurality of controllable switches, respectively, each of the plurality of managed battery cells including a respective one of the plurality of controllable switches connected in series with a respective one of the plurality of batteries to form a battery/switch pair, and a balancing resistor connected across the battery/switch pair, the plurality of managed battery cells being connected in series along a main power path, the series-connected plurality of managed battery cells being connectable to an external circuit,
  wherein the plurality of controllable switches included in the plurality of managed battery cells, respectively, are operative, in response to a detection of a battery condition associated with at least one of the plurality of batteries included in the plurality of managed battery cells, respectively, to synchronously transition from closed or "on" states to opened or "off" states for simultaneously disconnecting the plurality of batteries from the external circuit.

2. The system of claim 1 wherein each of the plurality of controllable switches included in the plurality of managed battery cells, respectively, is one of a relay, a contactor, an insulated gate bipolar transistor (IGBT), a metal-oxide substrate field effect transistor (MOSFET), a bipolar junction transistor (BJT), and a silicon controlled rectifier (SCR).

3. The system of claim 1 wherein each of the plurality of batteries included in the plurality of managed battery cells, respectively, is a lithium battery.

4. The system of claim 1 wherein the external circuit is a discharging circuit, wherein each of the plurality of controllable switches included in the plurality of managed battery cells, respectively, is a metal-oxide substrate field effect transistor (MOSFET), and wherein each of the plurality of controllable switches included in the plurality of managed battery cells, respectively, having synchronously transitioned from the closed or "on" states to the opened or "off" states, experience a voltage, $V_{sw}(n)$, expressible, as follows:

$$V_{SW}(n) = V_B \cdot \frac{2 \cdot n \cdot R_{FET\_max}}{(n-1) \cdot R_b + (n+1) \cdot R_{FET\_max}},$$

wherein "n" is a numeric quantity of the plurality of managed battery cells, "$V_B$" is a voltage of the respective batteries, "$R_b$" is a value of the respective balancing resistors, and "$R_{FET\_max}$" is a maximum leakage impedance of the MOSFET.

5. The system of claim 1 wherein the external circuit is a charging circuit, wherein each of the plurality of controllable switches included in the plurality of managed battery cells, respectively, is a metal-oxide substrate field effect transistor (MOSFET), and wherein each of the plurality of controllable switches included in the plurality of managed battery cells, respectively, having synchronously transitioned from the closed or "on" states to the opened or "off" states, experience a voltage, $V_{sw}(n)$, expressible, as follows:

$$V_{SW}(n) = (V_{B\_full} - V_B) \cdot \frac{2 \cdot n \cdot R_{FET\_max}}{(n-1) \cdot R_b + (n+1) \cdot R_{FET\_max}},$$

wherein "n" is a numeric quantity of the plurality of managed battery cells, "$V_B$" is a voltage of the respective batteries, "$R_b$" is a value of the respective balancing resistors, "$R_{FET\_max}$" is a maximum leakage impedance of the MOSFET, and "$V_{B\_full}$" is a maximum voltage of the respective batteries when fully charged.

6. The system of claim 1 further comprising:
  a plurality of controllers connected to the plurality of managed battery cells, respectively, the plurality of controllers including (1) a plurality of battery condition detectors, respectively, (2) a plurality of transmitters, respectively, (3) a plurality of receivers, respectively, and (4) a plurality of switch control modules, respectively, wherein each of the plurality of battery condition detectors included in the plurality of controllers, respectively, is operative to detect the battery condition associated with the respective battery included in a respective one of the plurality of managed battery cells connected thereto, and wherein each of the plurality of transmitters included in the plurality of controllers, respectively, is operative to transmit an indication of the detected battery condition to each of the plurality of controllers.

7. The system of claim 6 wherein each of the plurality of receivers included in the plurality of controllers, respectively, is operative to receive the indication of the detected battery condition, and wherein the plurality of switch control modules included in the plurality of controllers, respectively, are operative, based on the detected battery condition, to cause the plurality of controllable switches included in the plurality of managed battery cells, respectively, to synchronously transition from the closed or "on" states to the opened or "off" states for simultaneously disconnecting the plurality of batteries from the external circuit.

8. The system of claim 6 further comprising:
  a hardwire communication link interconnecting the plurality of controllers for use in transmitting and receiving the indication of the detected battery condition.

9. The system of claim 6 further comprising:
  a plurality of transmitting antennas, each of the plurality of transmitting antennas being connected to a respective one of the transmitters included in the respective controllers, each transmitting antenna being operative to transmit the indication of the detected battery condition, in the form of electromagnetic (EM) radiation, to the plurality of controllers; and
  a plurality of receiving antennas, each of the plurality of receiving antennas being connected to a respective one of the receivers included in the respective controllers, each receiving antenna being operative to receive the indication of the detected battery condition.

10. The system as in claim 1, wherein the detection of the battery condition further results in a simultaneous disconnection of the plurality of managed batteries with respect to each other.

11. The system as in claim 1, wherein the plurality of series-connected batteries includes an alternating pattern of batteries and switches.

12. The system as in claim 11, wherein the synchronous transition of the switches from closed or "on" states to opened or "off" states causes the batteries in the plurality of series-connected batteries to be electricallly isolated from each other.

13. A system for providing integrated battery protection for a plurality of series-connected batteries, comprising:
a plurality of managed battery cells including (1) a plurality of batteries, respectively, and (2) a plurality of controllable switches, respectively, each of the plurality of managed battery cells including a respective one of the plurality of controllable switches connected in series with a respective one of the plurality of batteries to form a battery/switch pair, and a balancing resistor connected across the battery/switch pair, the plurality of managed battery cells being connected in series along a main power path, the plurality of series-connected managed battery cells being connectable to an external circuit;
a plurality of controllers connected to the plurality of managed battery cells, respectively, the plurality of controllers including (1) a plurality of battery condition detectors, respectively, (2) a plurality of transmitters, respectively, (3) a plurality of receivers, respectively, and (4) a plurality of switch control modules, respectively, wherein each of the plurality of battery condition detectors included in the plurality of controllers, respectively, is operative to detect a battery condition associated with at least one of the plurality of batteries included in the plurality of managed battery cells, respectively, connected thereto, wherein each of the plurality of transmitters included in the plurality of controllers, respectively, is operative to transmit an indication of the detected battery condition to each of the plurality of controllers;
wherein each of the plurality of receivers included in the plurality of controllers, respectively, is operative to receive the indication of the detected battery condition, and wherein the plurality of switch control modules included in the plurality of controllers, respectively, are operative, based on the detected battery condition, to cause the plurality of controllable switches included in the plurality of managed battery cells, respectively, connected thereto to synchronously transition from closed or "on" states to opened or "off" states for simultaneously disconnecting the plurality of batteries from the external circuit.

14. The system of claim 13 wherein each of the plurality of controllable switches included in the plurality of managed battery cells, respectively, is one of a relay, a contactor, an insulated gate bipolar transistor (IGBT), a metal-oxide substrate field effect transistor (MOSFET), a bipolar junction transistor (BJT), and a silicon controlled rectifier (SCR).

15. The system of claim 13 wherein each of the plurality of batteries included in the plurality of managed battery cells, respectively, is a lithium battery.

16. A method of providing integrated battery protection for a plurality of series-connected batteries, comprising:
providing a plurality of series-connected managed battery cells including (1) a plurality of batteries, respectively, and (2) a plurality of controllable switches, respectively, each managed battery cell including a respective one of the plurality of batteries connected in series with a respective one of the plurality of controllable switches to form a battery/switch pair, and a balancing resistor connected across the battery/switch pair;
providing a plurality of controllers connected to the plurality of series-connected managed battery cells, respectively, each controller including a battery condition detector, a transmitter, a receiver, and a switch control module;
placing the plurality of controllable switches included in the plurality of series-connected managed battery cells, respectively, in closed or "on" states to connect the plurality of batteries included in the plurality of series-connected managed battery cells, respectively, to an external circuit;
detecting a certain fault or non-fault battery condition by the battery condition detector included in a respective one of the plurality of controllers;
generating an indication of the detected battery condition by the battery condition detector;
transmitting the indication of the detected battery condition by the transmitter included in the respective controller to each of the plurality of controllers;
receiving the indication of the detected battery condition at the receiver included in each of the plurality of controllers; and
based on the detected battery condition, generating a control signal by the switch control module included in each of the plurality of controllers to cause the plurality of controllable switches within the plurality of series-connected managed battery cells, respectively, to synchronously transition from the closed or "on" states to opened or "off" states for simultaneously disconnecting or otherwise isolating the plurality of batteries within the plurality of series-connected managed battery cells, respectively, from the external circuit of which the respective batteries were a part.

17. The method of claim 16 wherein the transmitting of the indication of the detected battery condition includes transmitting the indication of the detected battery condition over a hardwire communication link interconnecting the plurality of controllers.

18. An apparatus comprising:
multiple batteries including a first battery and a second battery;
multiple switches including a first switch and a second switch;
a first battery cell in which the first switch and the first battery are connected in series;
a second battery cell in which the second switch and the second battery are connected in series, simultaneous activation of the first switch and the second switch to CLOSED states connecting the first battery and the second battery in series to power an external load; and
controller circuitry operable to simultaneously transition both the first switch and the second switch from the CLOSED states to OPEN states to prevent a combination of the first battery and the second battery from being connected in series and powering the external load.

19. The apparatus as in claim 18, wherein the simultaneous transition of the first switch and the second switch from the CLOSED states to the OPEN states electrically isolates the first battery from being connected to the second battery.

20. The apparatus as in claim 18, wherein the controller is operable to simultaneously transition the first switch and the second switch in response to detecting a predetermined condition associated with the first battery.

* * * * *